United States Patent
Nishijima

(10) Patent No.: US 11,735,212 B1
(45) Date of Patent: Aug. 22, 2023

(54) THERMALLY ASSISTED MAGNETIC HEAD INCLUDING A RECORD/READ SEPARATE PROTECTIVE STRUCTURE, HEAD GIMBAL ASSEMBLY AND HARD DISK DRIVE EACH HAVING THE THERMALLY ASSISTED MAGNETIC HEAD

(71) Applicant: SAE Magnetics (H.K.) Ltd., Hong Kong (HK)

(72) Inventor: Natsuo Nishijima, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 0 days.

(21) Appl. No.: 17/727,850

(22) Filed: Apr. 25, 2022

(51) Int. Cl.
*G11B 5/48* (2006.01)
*G11B 5/31* (2006.01)
*G11B 5/00* (2006.01)
*G11B 13/08* (2006.01)

(52) U.S. Cl.
CPC ............ *G11B 5/4826* (2013.01); *G11B 5/314* (2013.01); *G11B 5/3106* (2013.01); *G11B 13/08* (2013.01); *G11B 2005/0021* (2013.01)

(58) Field of Classification Search
CPC .......... G11B 2005/0021; G11B 7/1387; G11B 5/314; G11B 5/6088; G11B 11/1058; G11B 7/122; G11B 5/40
See application file for complete search history.

(56) References Cited

U.S. PATENT DOCUMENTS

| 5,985,163 | A | * | 11/1999 | Cha .................... G11B 5/3106 |
| 8,638,645 | B1 | | 1/2014 | Nishijima et al. |
| 8,902,720 | B1 | * | 12/2014 | Schreck .............. G11B 5/3106 |
| | | | | 369/13.13 |
| 9,099,129 | B2 | | 8/2015 | Nishijima et al. |
| 9,245,544 | B1 | | 1/2016 | Nishijima et al. |
| 9,741,374 | B1 | * | 8/2017 | Isogai ...................... G11B 5/40 |
| 9,997,178 | B1 | * | 6/2018 | Nishimura ........... G11B 5/6088 |
| 10,002,626 | B1 | | 6/2018 | Cheng et al. |
| 10,068,596 | B2 | | 9/2018 | Staffaroni et al. |
| 10,482,906 | B2 | | 11/2019 | Chen et al. |
| 10,614,841 | B1 | * | 4/2020 | Hosoi .................. G11B 5/4826 |
| 10,815,562 | B2 | * | 10/2020 | Firouzdor ............... C23C 16/50 |
| 11,562,766 | B1 | * | 1/2023 | Nishijima ............ G11B 5/3106 |
| 2002/0110079 | A1 | * | 8/2002 | Kishima ........... G11B 11/10586 |
| 2003/0074784 | A1 | * | 4/2003 | Konishi ................. G11B 5/255 |
| | | | | 360/122 |
| 2004/0037012 | A1 | * | 2/2004 | Nakanishi ............ G11B 5/3967 |
| 2005/0007894 | A1 | * | 1/2005 | Hasegawa ................ G11B 7/14 |

(Continued)

*Primary Examiner* — Brian E Miller

(57) ABSTRACT

A thermally assisted magnetic head includes a slider, the slider includes a slider substrate and a magnetic head part. The magnetic head part includes a recording head, a reading head, a near field transducer and a medium-opposing surface. The medium-opposing surface includes a recording area and a reading area. The magnetic head part includes a record/read separately protective structure which a stabilized protective film is formed on the recording area and a reading head protective film is formed on the reading area. The stabilized protective film includes a three-layers structure which a seed layer and a double protective layer are laminated. The double protective layer includes a YSZ protective layer and a hard protective layer. The reading head protective film includes a thickness which is thinner than the stabilized protective film.

15 Claims, 27 Drawing Sheets

(56) References Cited

U.S. PATENT DOCUMENTS

| | | | |
|---|---|---|---|
| 2005/0264938 A1* | 12/2005 | Yasui | G11B 5/40 |
| 2006/0034014 A1* | 2/2006 | Kato | G11B 5/314 |
| 2006/0139810 A1* | 6/2006 | Hashimoto | G11B 5/40 |
| | | | 360/235.8 |
| 2007/0258171 A1* | 11/2007 | Ohtsu | G11B 5/6064 |
| 2009/0135521 A1* | 5/2009 | Ueda | C23C 16/26 |
| | | | 427/127 |
| 2009/0201598 A1* | 8/2009 | Masuda | G11B 5/6064 |
| | | | 360/75 |
| 2010/0291294 A1* | 11/2010 | Ueda | G11B 5/102 |
| | | | 427/127 |
| 2012/0113772 A1* | 5/2012 | Shiono | G11B 7/1378 |
| 2012/0155232 A1 | 6/2012 | Schreck et al. | |
| 2012/0307397 A1* | 12/2012 | Biskeborn | G11B 5/3106 |
| | | | 360/110 |
| 2013/0153408 A1* | 6/2013 | Ramm | C23C 14/0021 |
| | | | 204/192.15 |
| 2014/0059842 A1* | 3/2014 | Biskeborn | G11B 5/295 |
| | | | 427/127 |
| 2016/0180871 A1* | 6/2016 | Brong | G11B 5/00813 |
| | | | 360/125.72 |
| 2016/0275973 A1 | 9/2016 | Cheng et al. | |
| 2019/0066719 A1* | 2/2019 | Macken | G11B 5/3106 |

* cited by examiner

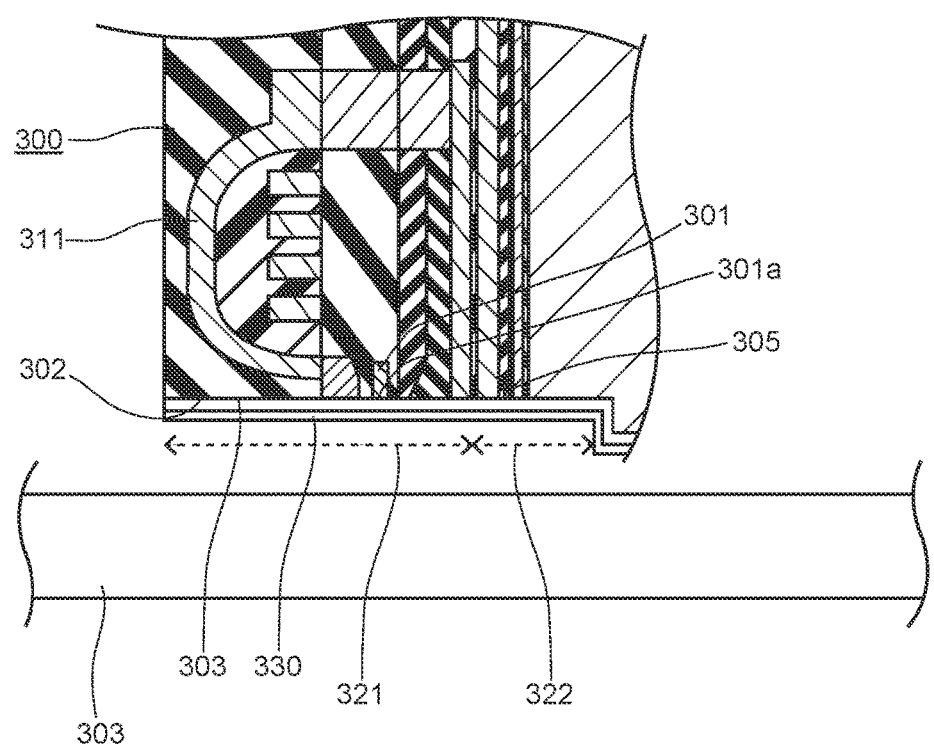

THERMALLY ASSISTED MAGNETIC HEAD INCLUDING A RECORD/READ SEPARATE PROTECTIVE STRUCTURE, HEAD GIMBAL ASSEMBLY AND HARD DISK DRIVE EACH HAVING THE THERMALLY ASSISTED MAGNETIC HEAD

BACKGROUND

Field of the Invention

The present invention relates to a thermally assisted magnetic head recording data on a magnetic recording medium by thermally assisted magnetic recording using near-field light, a head gimbal assembly and a hard disk drive each having the thermally assisted magnetic head.

Related Background Art

In recent years, as magnetic disk drives have been increasing their recording densities, thin-film magnetic heads recording data on a magnetic recording medium have been required to further improve their performances. As the thin-film magnetic heads, those of composite type having a structure in which a reproducing head having a magnetoresistive device (hereinafter, referred to also as an "MR device") for read and a recording head having an electromagnetic coil device for write are laminated have been conventionally in wide use. In a magnetic disk drive, the thin-film magnetic head is provided on a slider which very slightly floats from the magnetic recording medium.

Incidentally, the magnetic disk drive records data by magnetizing magnetic fine particles on the magnetic recording medium using the recording head. In order to increase the recording density of the magnetic recording medium, it is effective to make the magnetic fine particles smaller.

When the magnetic fine particles are made smaller, however, there arises a problem that the magnetization thereof becomes unstable with respect to heat as the particles reduce in volume, thereby increasing the possibility that the data recorded on the magnetic recording medium is lost. To solve the problem, it is effective to increase the magnetic energy of the magnetic fine particles to thereby enhance the stability of magnetization. When the magnetic energy of the magnetic fine particles is increased, however, there arises another problem that the coercive force (difficulty in reversing magnetization) of the magnetic recording medium increases to deteriorate the data recording performance.

To solve such problems, a method called thermally assisted magnetic recording has been conventionally proposed. When recording data on a magnetic recording medium having a large coercive force, the thin-film magnetic head employing the thermally assisted magnetic recording (hereinafter, referred to as a "thermally assisted magnetic head") records data while instantaneously heating and thereby increasing the temperature of a portion of the magnetic recording medium where data will be recorded.

Since the magnetic fine particles decrease in coercive force when the temperature is increased, instantaneous heating makes it possible to record data even on the magnetic recording medium having a high coercive force at room temperature. The portion of the magnetic recording medium where the data has been recorded is decreased in temperature after the recording of data and thereby increases in coercive force. Therefore, by using the thermally assisted magnetic head, it becomes possible to make the magnetic fine particles finer as well as stabilize recording in the magnetic disk drive.

On the other hand, near-field light is used as means for heating the magnetic recording medium in the conventional thermally assisted magnetic head. When light enters an opening smaller than the wavelength of light, the light slightly seeps from the opening and locally exists near the opening. The light locally existing near the opening is called near-field light. The near-field light is confined in a region much smaller than that of a spot light obtained by collecting light using a lens, so that use of the near-field light makes it possible to heat only a limited extremely small recording region of the magnetic recording medium. A conventional technology concerning the thermally assisted magnetic recording is disclosed in, for example, US 2012-0155232 (also called patent document 1).

By the way, in the thermally assisted magnetic head, a member, which is called a near field transducer (hereinafter, referred to as an "NFT") or a plasmon generator, is provided for generating the near-field light.

Besides, the thermally assisted magnetic head, which a "PEG" is formed in the NFT ("PEG formed Head"), is conventionally known (for example, U.S. Pat. No. 10,068,596 (also called patent document 2), U.S. Pat. No. 10,482,906 (also called patent document 3)). The "PEG" is a small protruding part for concentrating the near-field light.

For example, as the thermally assisted magnetic head 300, illustrated in FIG. 25, the conventional thermally assisted magnetic head has a recording head 311 and the NFT 301. As illustrated in FIG. 26, the NFT 301 has a PEG 301a, which is arranged in a medium opposing surface (Air Bearing Surface, hereinafter, also referred to as an "ABS") 302. Laser light 300L is guided to the NFT 301, thereby the near-field light is generated. Energy of the Laser light 300L is absorbed by the NFT 301, during magnetic recording action of the recording head 311.

Thereby, temperature of the NFT 301, especially temperature of the PEG 301a, which is formed in the tip, rises (PEG heating ①). In accordance with temperature rise of the PEG 301a (PEG heating ①), temperature of a magnetic recording medium 303 rises (Media heating ②). Then, in accordance with temperature rise of the magnetic recording medium 303 (Media heating ②), temperature of the thermally assisted magnetic head 300 rises (Head heating ③). Temperature rise of the thermally assisted magnetic head 300 is also called as "Media back heating". Temperature of the PEG 301a rises further in accordance with the Media back heating, thereby temperature of the recording head 311 rises (because the recording head 311 has a part exposed in the ABS 302).

Especially, when temperature of the PEG 301a rises in accordance with the Media back heating, deformation or recession of the PEG 301a is likely to occur, thereby the PEG 301a is likely to touch the magnetic recording medium 303.

Then, in the conventional thermally assisted magnetic head, a protective film is sometimes formed on the medium opposing surface so that the recording head and the NFT is protected from the Media back heating (see for example, US 2016/0275973 (also called patent document 4), U.S. Pat. No. 8,638,645 (also called patent document 5), U.S. Pat. No. 9,099,129 (also called patent document 6), U.S. Pat. No. 9,245,544 (also called patent document 7), U.S. Pat. No. 10,002,626 (also called patent document 8).

SUMMARY OF THE INVENTION

In the conventional thermally assisted magnetic head, which the protective film is formed on the medium opposing surface, for example, as a thermally assisted magnetic head 310, illustrated in FIG. 27, a protective film 330 is formed on not only a recording area 321 but also a reading area 322 (see, patent documents 5, 6 in detail). The recording head 311 and the NFT 301 is arranged in the recording area 321. The MR device 305 is arranged in the reading area 322.

In the thermally assisted magnetic head 310, a seed layer 331 is formed in an ABS 302, the protective film 330 is formed on the seed layer 331. The seed layer 331 is formed so as to enhance the protective film 330. For example, the protective film 330 is formed with DLC (Diamond Like Carbon), Zirconium Oxide ($ZrO_2$).

It is preferable that the protective film 330 is formed on the ABS 302 together with the seed layer 331, for protecting the PEG 301a, the recording head 311 from the Media back heating, as the thermally assisted magnetic head 310.

However, in the thermally assisted magnetic head 310, the protective film 330 and the seed layer 331 are formed on not only the recording area 321 but also the reading area 322. Therefore, a reading head (for example, MR device) 305 of the reading area 322 is covered doubly with the protective film 330 and the seed layer 331. Then, because the reading head (for example, MR device) 305 is covered excessively, thereby magnetic data reading sensitivity of the reading head 305 is lowers.

On the other hand, it is preferable that only the protective film 330 is formed on the ABS 302 without forming the seed layer 331 so as not to lower the reading sensitivity of the reading head 305.

Then, the reading area 322 and the recording area 321 are covered with the protective film 330 only. It is extremely difficult that necessary strength for sure protection of the recording area 321 (the recording head 311 and NFT 301) is secured by the protective film 330 only. Therefore, it is extremely difficult that the PEG 301a is protected with the only protective film 330 on the ABS 302 so that deformation and recession does not occur.

Moreover, zirconium oxide, which is used for the protective film 330, includes orthorhombic crystal structure in normal temperature though, phase transition of crystal structure, from orthorhombic crystal to cubic crystal or tetragonal crystal, occurs when temperature rises. Volume change is caused by phase transition. Therefore, when temperature change which includes phase transition occurs, sintered body made of zirconium oxide is broken, a crack appears in the protective film as a result.

Besides, because the protective film 330 of the thermally assisted magnetic head 310 is formed on the ABS 302, the protective film 330 can not avoid temperature rise which is caused by Media back heating.

Therefore, a crack is likely to appear in the protective film 330 of the thermally assisted magnetic head 310, because of temperature rise caused by Media back heating (because crystal structure of zirconium oxide change in accordance with temperature rise, it is not stabilized). Then, the recording head and NFT are not likely to be protected from Media back heating, by the protective film 330 of the thermally assisted magnetic head 310.

Namely, it is extremely difficult that both following 1) and 2) are able to be achieved even if the protective film is formed on the medium opposing surface.
1) The recording head and the NFT are surely protected so that deformation and recession of the PEG does not occur.
2) The reading head is protected to an extent which the magnetic data reading sensitivity does not lower.

Hence the present invention is made to solve the above problem, and it is an object to provide the thermally assisted magnetic head having a structure which 2 points, namely 1) the recording head and the NFT are surely protected and 2) the reading head is protected to an extent which the magnetic data reading sensitivity does not lower, are able to be achieved, the head gimbal assembly and the hard disk drive each having the thermally assisted magnetic head.

To solve the above problem, the present invention provides a thermally assisted magnetic head including: a slider; the slider includes a slider substrate and a magnetic head part formed on the slider substrate, the magnetic head part comprises a recording head including an electromagnetic coil device for recording magnetic data, a reading head for reading magnetic data recorded on a magnetic recording medium, a near field transducer which generates a near field light for heating the magnetic recording medium, a medium-opposing surface opposing the magnetic recording medium, the medium-opposing surface includes a recording area including the recording head, the near field transducer and a reading area including the reading head, the magnetic head part includes a record/read separate protective structure which a stabilized protective film is formed on the recording area and a reading head protective film is formed on the reading area, the stabilized protective film includes a three-layer structure which a seed layer and a double protective layer are laminated, the double protective layer comprises an yttria-stabilized zirconia (YSZ protective layer, including a stabilized crystal structure made of adding yttrium oxide to zirconium oxide, and a hard protective layer, which is formed with material having a hardness higher than the YSZ protective layer, being formed on the YSZ protective layer, the reading head protective film includes a thickness which is thinner than the stabilized protective film.

In case of the above-described thermally assisted magnetic head, it is preferable that the YSZ protective layer includes a Y/(Y+Zr) ratio which is set in a range of between 5 to 30, the Y/(Y+Zr) ratio means a ratio of molecular weight of yttrium in the yttrium oxide to molecular weight of yttrium in the yttrium oxide and zirconium in the zirconium oxide.

Further, in the above-described thermally assisted magnetic head, it is possible that the reading head protective film includes a single-layer structure which is formed with one layer.

Further, in the above-described thermally assisted magnetic head, it is preferable that the reading head protective film is formed with material in common with the hard protective layer.

In the above-described thermally assisted magnetic head, it is possible that the magnetic head part includes a protective film step which is formed by a recession of a surface of the reading head protective film from a surface of the stabilized protective film.

Further, in the above-described thermally assisted magnetic head, it is possible that the YSZ protective layer and the hard protective layer respectively include end surfaces exposed in a boundary part of the recording area and the reading area.

Further, in the above-described thermally assisted magnetic head, it is preferable that the medium-opposing surface includes a step-ABS structure which includes a step by a recession of the recording area from the reading area.

Further, in the above-described thermally assisted magnetic head, it is possible that the magnetic head part comprises a flat structure which the surface of the seed layer is connected to the surface of the reading head protective film with no step.

In the above-described thermally assisted magnetic head, it is possible that magnetic head part includes a series structure which the hard protective layer is connected with the reading head protective film, there is no boundary between the hard protective layer and the reading head protective film.

In the above-described thermally assisted magnetic head, it is possible that a thickness of the hard protective layer is smaller than that of the reading head protective film.

Further, in the above-described thermally assisted magnetic head, it is possible that both a thickness of the YSZ protective layer and a thickness of the hard protective layer are smaller than that of the reading head protective film.

Further, in the above-described thermally assisted magnetic head, it is possible that the hard protective layer and the reading head protective film are formed with DLC.

Further, in the above-described thermally assisted magnetic head, it is possible the near field transducer includes a protruding end part, arranged in a side of the medium-opposing surface, the protruding end part is arranged in a recess surface, arranged in the recording area of the medium-opposing surface.

Then, the present invention provides a head gimbal assembly including a thermally assisted magnetic head, the thermally assisted magnetic head including: a slider; the slider includes a slider substrate and a magnetic head part formed on the slider substrate, the magnetic head part includes a recording head including an electromagnetic coil device for recording magnetic data, a reading head for reading magnetic data recorded on a magnetic recording medium, a near field transducer which generates a near field light for heating the magnetic recording medium, a medium-opposing surface opposing the magnetic recording medium, the medium-opposing surface includes a recording area including the recording head, the near field transducer and a reading area including the reading head, the magnetic head part comprises a record/read separate protective structure which a stabilized protective film is formed on the recording area and a reading head protective film is formed on the reading area, the stabilized protective film comprises a three-layer structure which a seed layer and a double protective layer are laminated, the double protective layer comprises a YSZ protective layer, including a stabilized crystal structure made of adding yttrium oxide to zirconium oxide, and a hard protective layer, which is formed with material having a hardness higher than the YSZ protective layer, being formed on the YSZ protective layer, the reading head protective film includes a thickness which is thinner than the stabilized protective film.

Further, the present invention provides a hard disk drive including a head gimbal assembly having a thermally assisted magnetic head, and a magnetic recording medium opposing the thermally assisted magnetic head, the thermally assisted magnetic head including: a slider; the slider includes a slider substrate and a magnetic head part formed on the slider substrate, the magnetic head part includes a recording head including an electromagnetic coil device for recording magnetic data, a reading head for reading magnetic data recorded on a magnetic recording medium, a near field transducer which generates a near field light for heating the magnetic recording medium, a medium-opposing surface opposing the magnetic recording medium, the medium-opposing surface includes a recording area including the recording head, the near field transducer and a reading area including the reading head, the magnetic head part includes a record/read separate protective structure which an enhanced protective film is formed on the recording area and a reading head protective film is formed on the reading area, the stabilized protective film includes a three-layer structure which a seed layer and a double protective layer are laminated, the double protective layer comprises a YSZ protective layer, including a stabilized crystal structure made of adding yttrium oxide to zirconium oxide, and a hard protective layer, which is formed with material having a hardness higher than the YSZ protective layer, being formed on the YSZ protective layer, the reading head protective film includes a thickness which is thinner than the stabilized protective film.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 27 is a sectional view illustrating principal part of another conventional thermally assisted magnetic head.

DETAILED DESCRIPTION OF THE EMBODIMENTS

In the following, embodiments of the present invention will be described with reference to the drawings. Note that the same components will be referred to with the same numerals or letters, while omitting their overlapping descriptions.

(Structure of the Thermally Assisted Magnetic Head)

Figure 1:
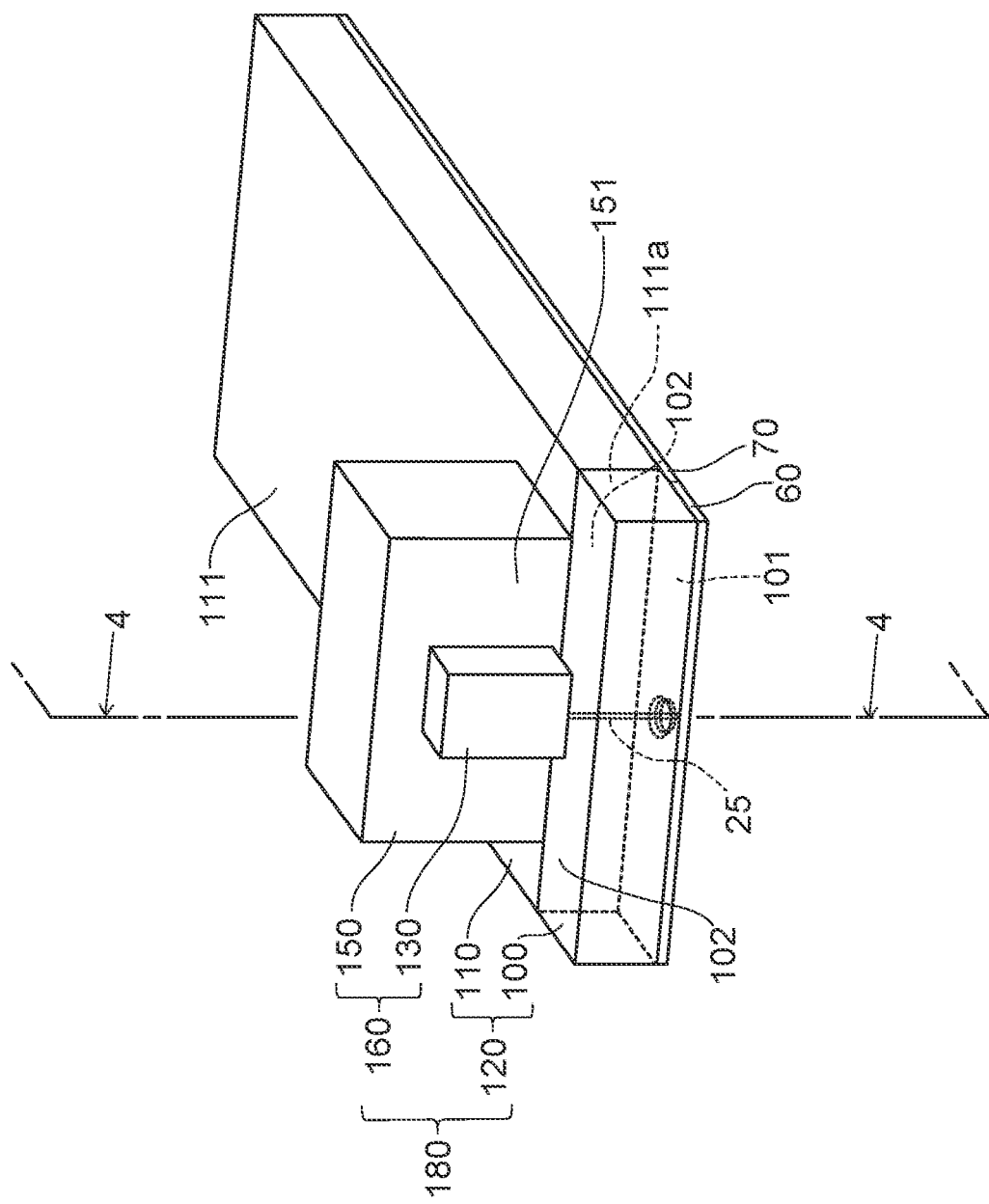
FIG. 1 is a perspective view of the thermally assisted magnetic head according to an embodiment of the present invention.
Figure 2:
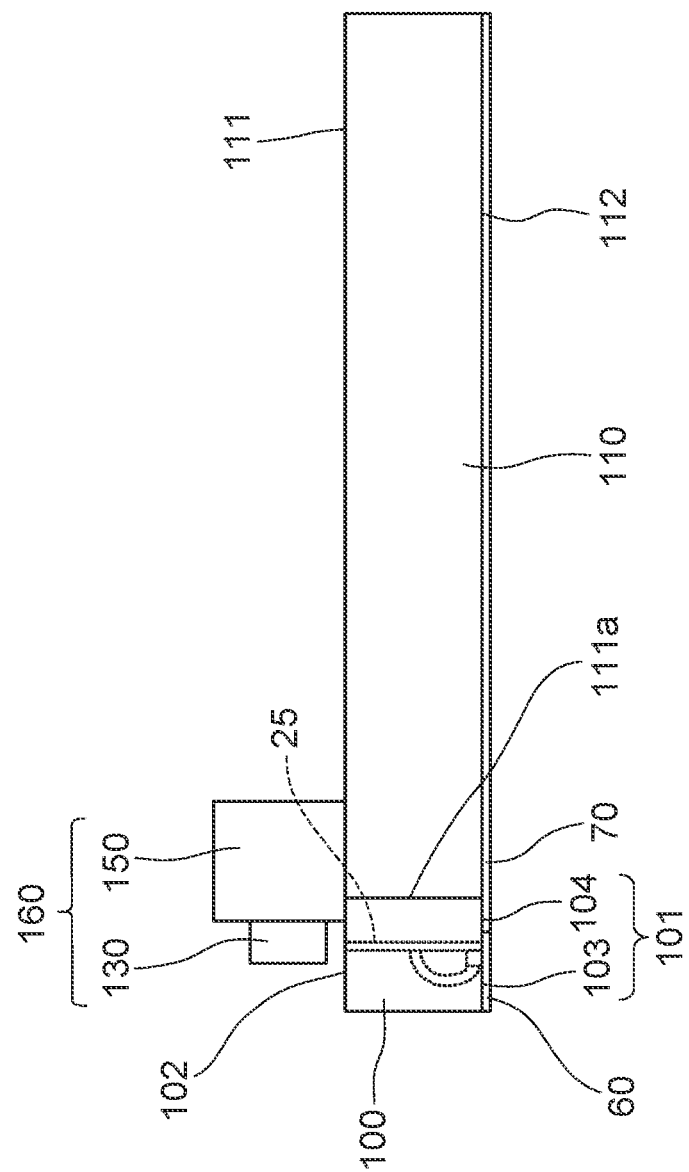
FIG. 2 is a side view of the thermally assisted magnetic head according to the embodiment of the present invention.
Figure 3:
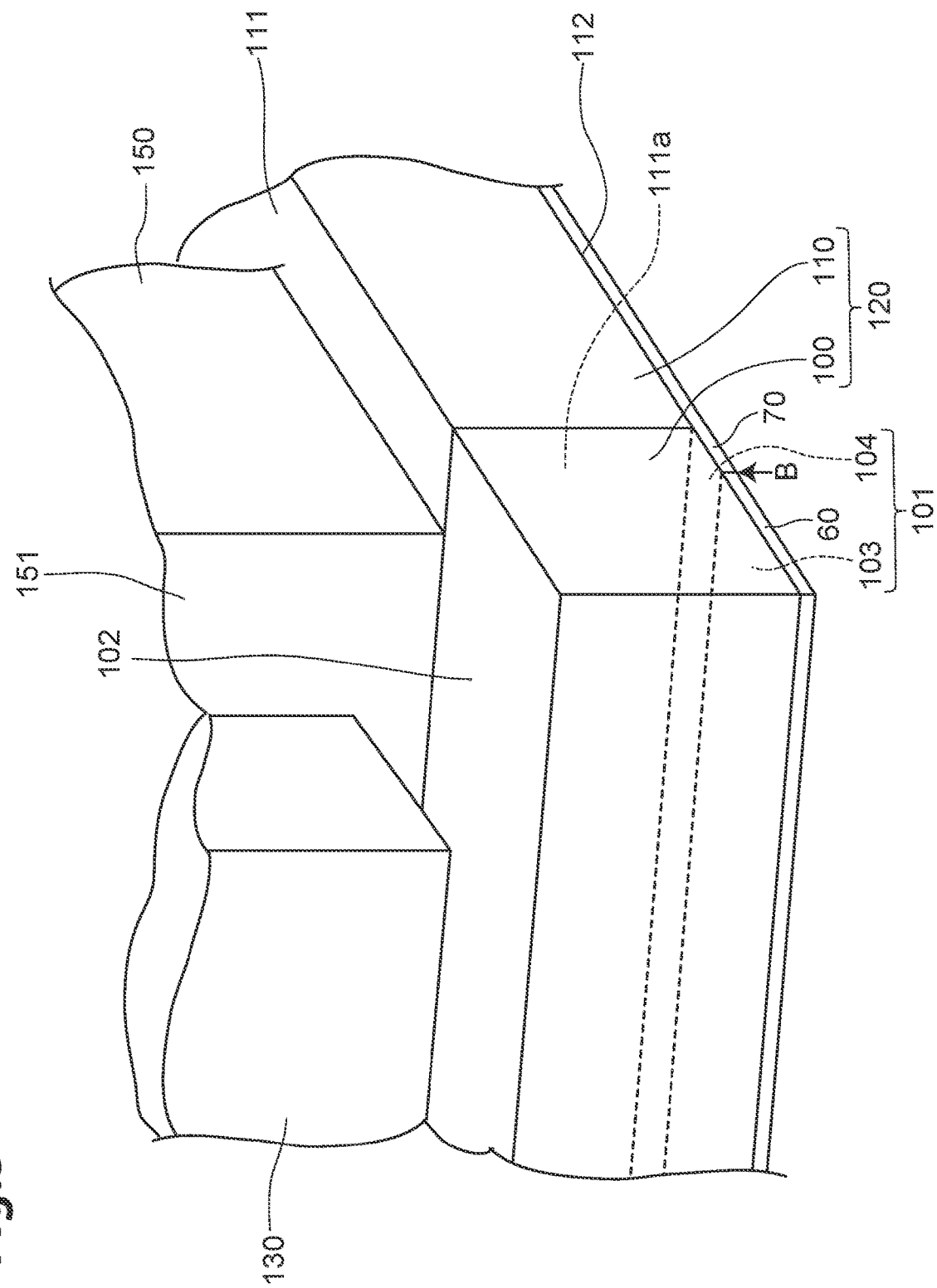
FIG. 3 is a perspective view, with enlargement, of the principal part of the thermally assisted magnetic head.
Figure 4:
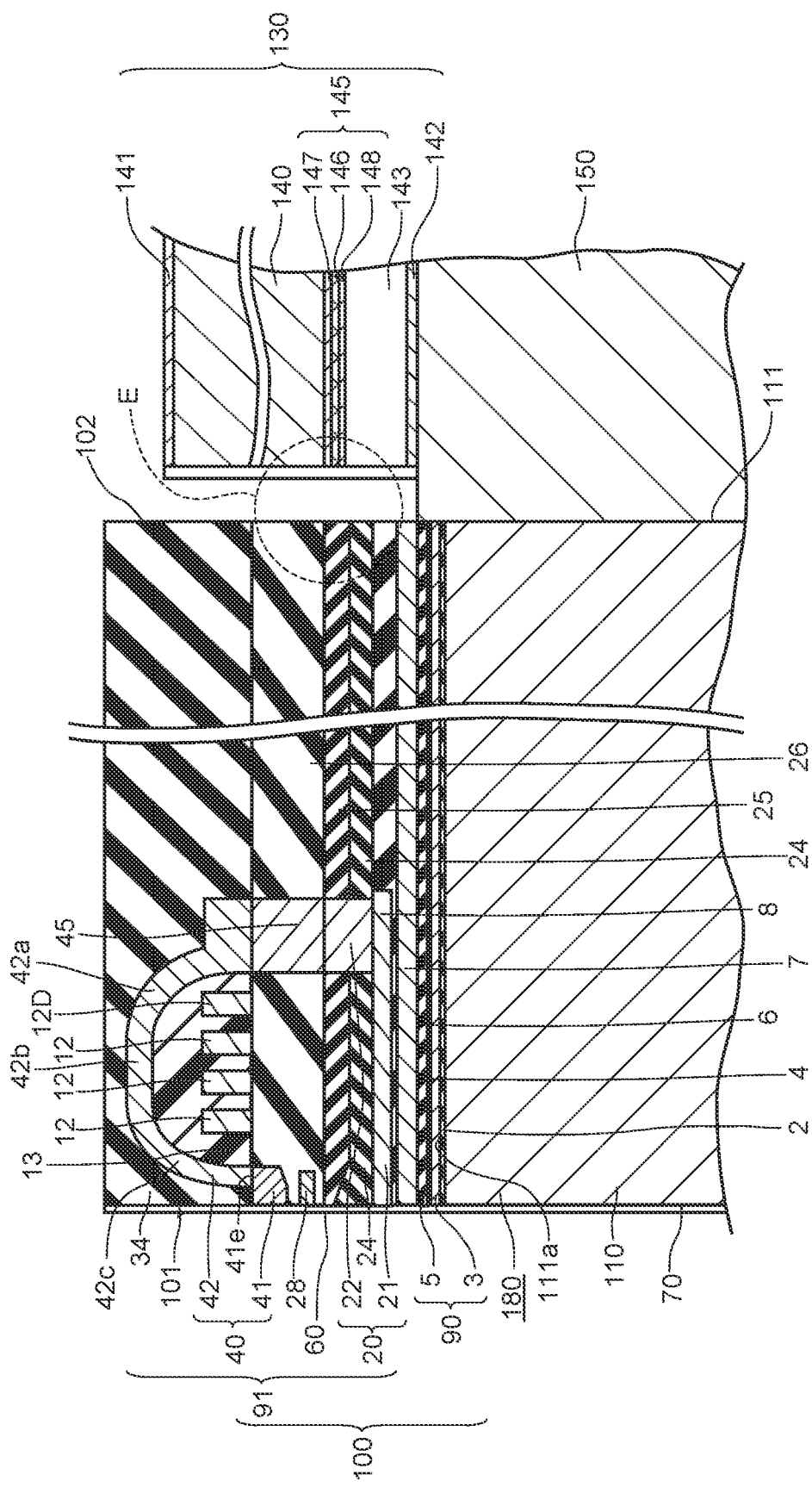
FIG. 4 is a sectional view of the principal part taken along the line 4-4 in FIG. 1.
Figure 5:
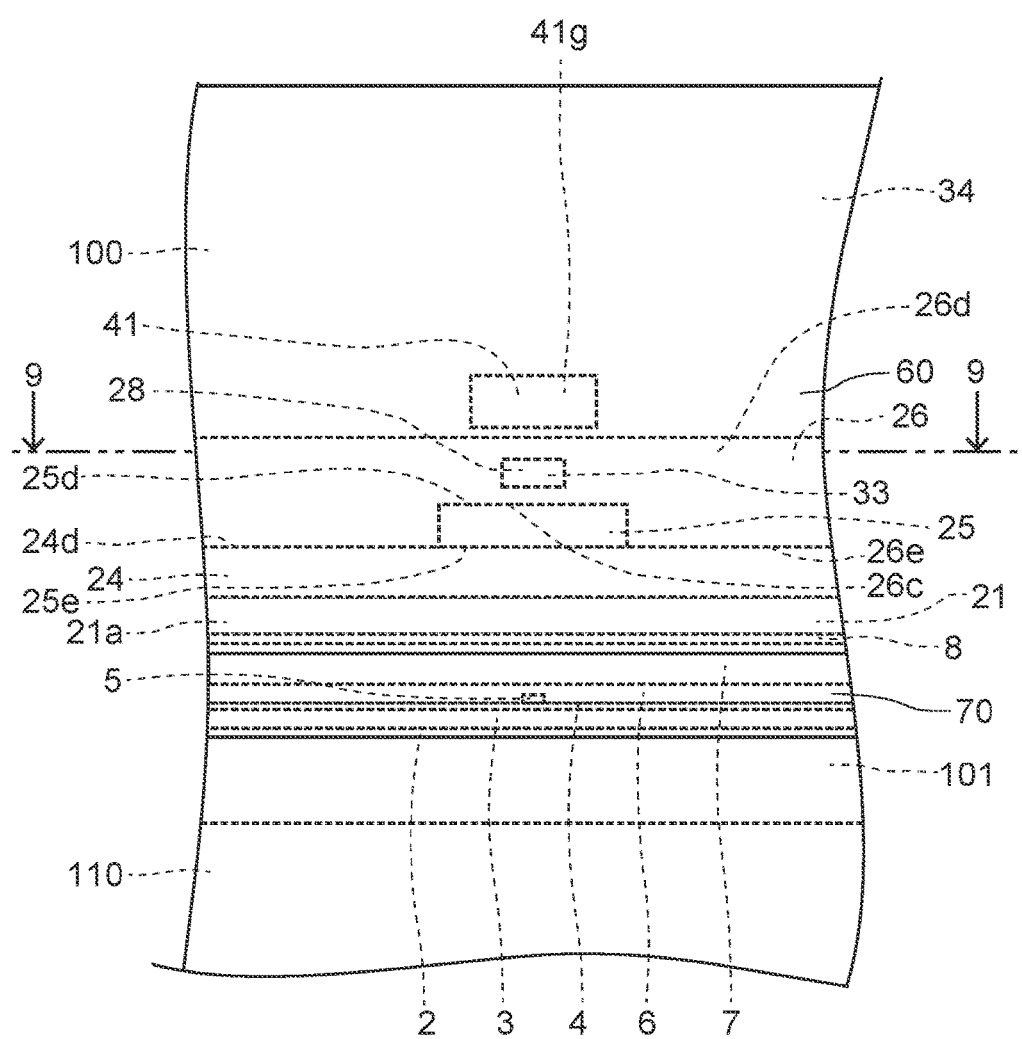
FIG. 5 is a front view illustrating a surface of an ABS side of a magnetic head part.
Figure 6:
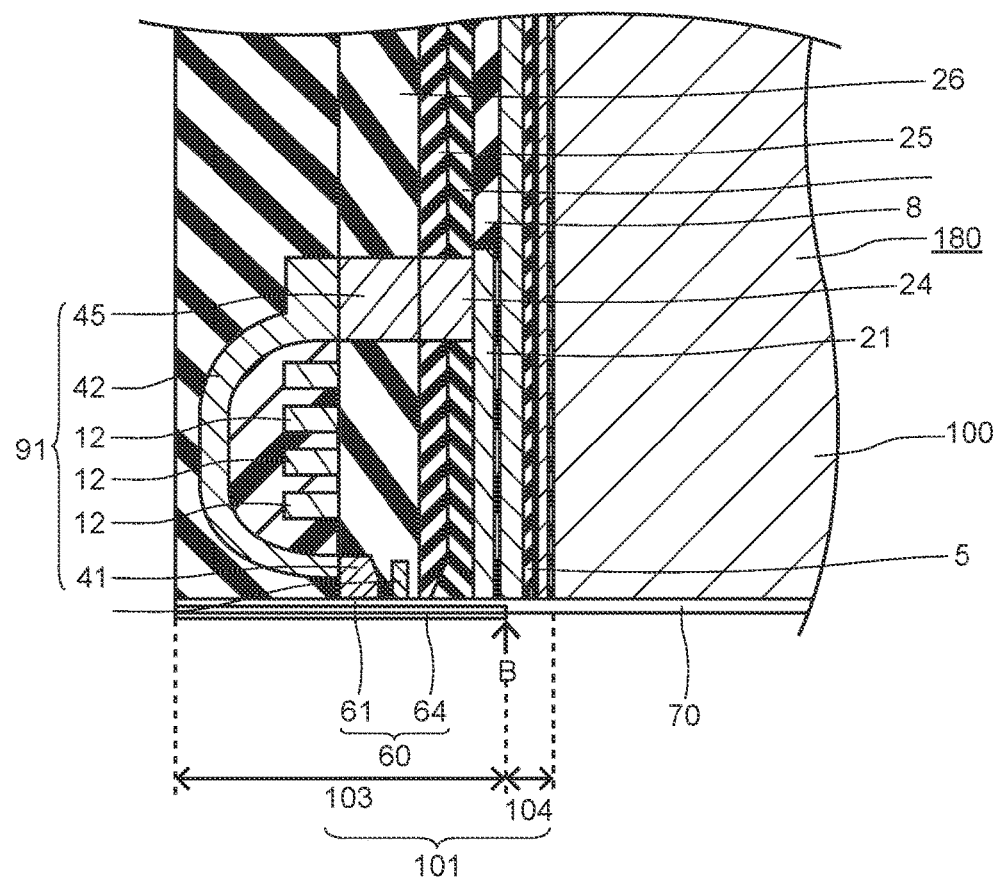
FIG. 6 is a sectional view, with enlargement, of the principal part in FIG. 4.
Figure 7:
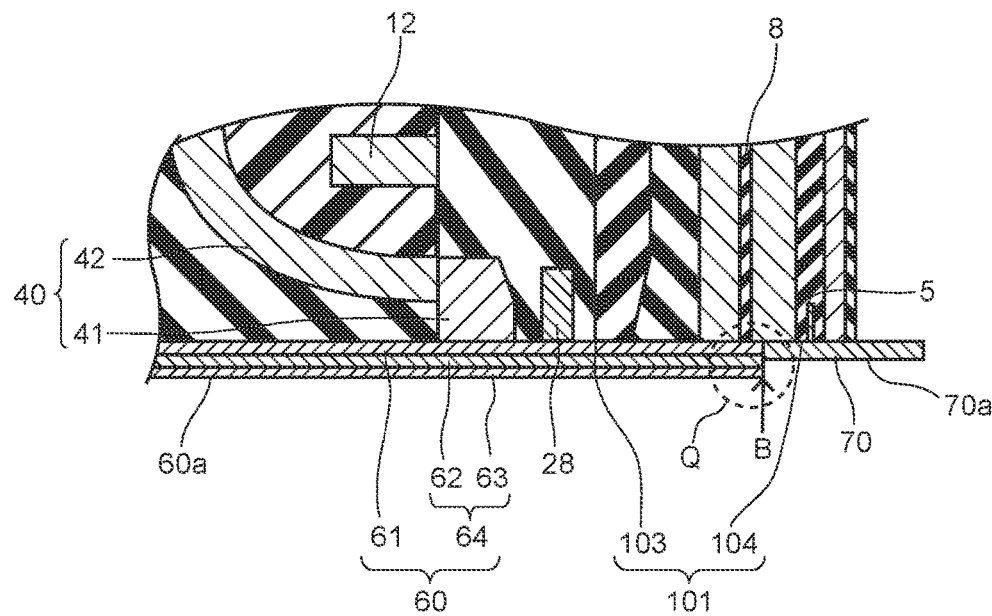
FIG. 7 is a sectional view, with enlargement, of the principal part in FIG. 6.
Figure 8:
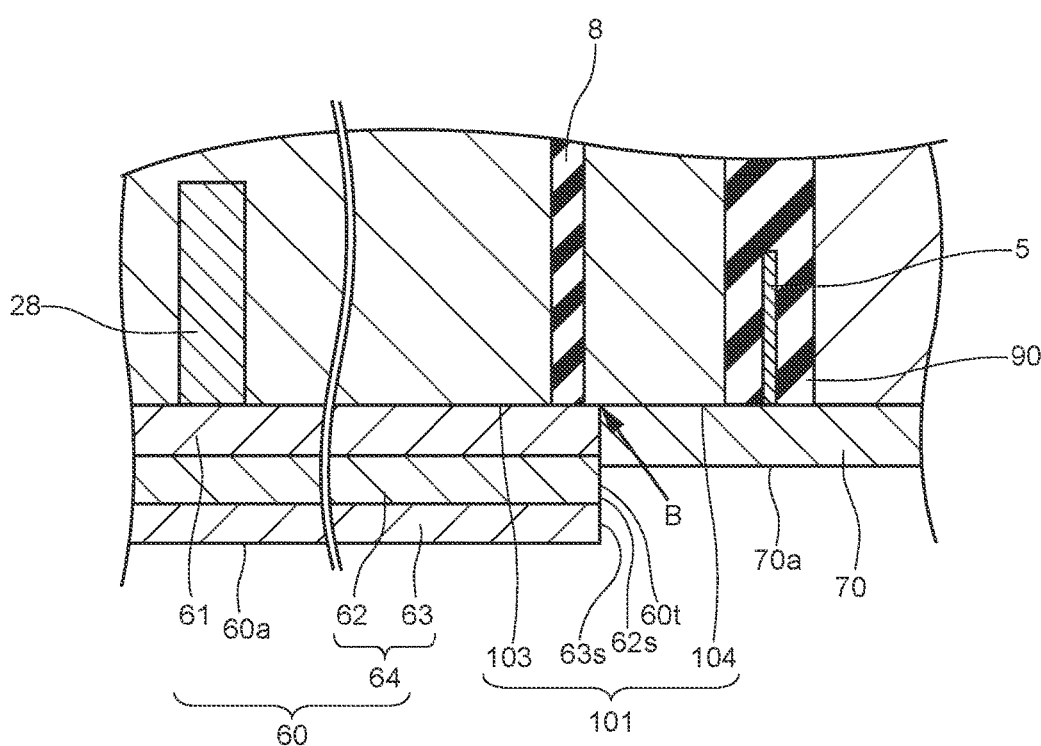
FIG. 8 is a sectional view, with enlargement, of the principal part in FIG. 7 so as to clarify the part indicated with Q.
Figure 9:
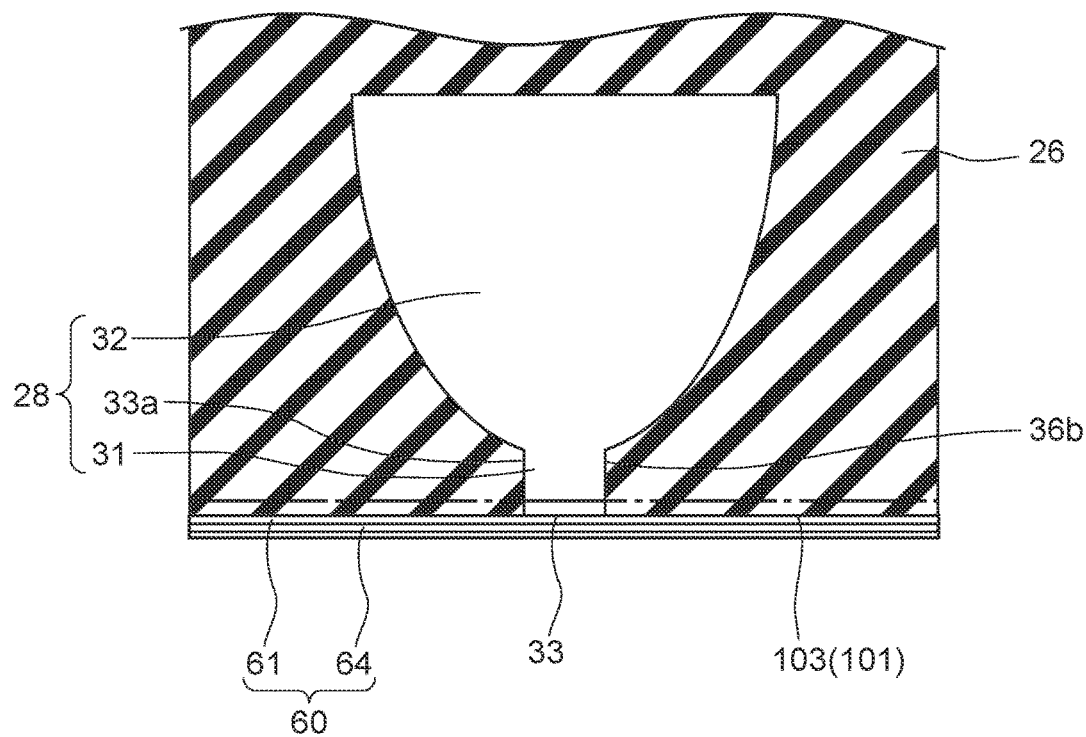
FIG. 9 is a plan view showing the sectional surface of the thermally assisted magnetic head taken along the line 9-9 in FIG. 5.

To begin with, structure of the thermally assisted magnetic head according to the embodiment of the present invention will be explained with reference to FIG. 1 to FIG. 9. Here, FIG. 1 is a perspective view of the thermally assisted magnetic head 180 according to the embodiment of the present invention, FIG. 2 is a side view of the thermally assisted magnetic head 180 according to the embodiment of the present invention, FIG. 3 is a perspective view, with enlargement, of the principal part of the thermally assisted magnetic head 180. FIG. 4 is a sectional view of principal part taken along the line 4-4 in FIG. 1, FIG. 5 is a front view illustrating a surface of a medium opposing surface (Air Bearing Surface, which will hereinafter be referred also to as "ABS") 101 side of the magnetic head part 100, FIG. 6 is a sectional view, with enlargement, of the principal part in FIG. 4. FIG. 7 is a sectional view, with enlargement, of the principal part in FIG. 6. FIG. 8 is a sectional view, with enlargement, of the principal part in FIG. 7 so as to clarify the part indicated with Q. FIG. 9 is a plan view showing the sectional surface of the thermally assisted magnetic head 180 taken along the line 9-9 in FIG. 5.

The thermally assisted magnetic head 180 has a slider 120 and a light source-unit 160 joined to the slider 120. The thermally assisted magnetic head 180 has a complex-slider-structure which the slider 120 is joined to the light source-unit 160.

The slider 120 has a slider-substrate 110 and the magnetic head part 100 formed on the slider-substrate 110.

The slider-substrate 110 is made of a ceramic material such as aluminum oxide-titanium carbide ($Al_2O_3 \cdot TiC$) or the like, and it is formed in a rectangular parallelepiped shape. The slider-substrate 110 has the ABS 101 as the medium opposing surface, opposing to the magnetic recording medium, a light source placing surface 111, arranged in the rear side of the ABS 101. A part, of the light source placing surface 111, of the magnetic head part 100 side is a light source-opposing surface 102. The light source-opposing surface 102 opposes to a later-described laser diode 130 of the light source-unit 160.

The thermally assisted magnetic head 180 has a record/read separate protective structure. As illustrated in FIG. 2, FIG. 3, the record/read separate protective structure means a structure which a stabilized protective film 60 and a reading head protective film 70 are respectively formed in a recording area 103 and a reading area 104 to protect separately a recording head 91, a later-described NFT 28, being included in the recording area 103 and a reading head 90, being included in the reading area 104. Because the thermally assisted magnetic head 180 includes the record/read separate protective structure, both of two points, which are indicated in the following A), B), are achieved, in the thermally assisted magnetic head 180.

A) the recording head 91 and the NFT 28 are effectively and surely protected so that deformation and recession of the later-described PEG 31 do not occur.

B) the reading head 90 (MR device 5) is protected to an extent which the magnetic data reading sensitivity does not lower.

(Magnetic Head Part)

Subsequently, the magnetic head part 100 will be explained with mainly reference to FIG. 4 to FIG. 6. The magnetic head part 100 has the reading head 90, the recording head 91 and the NFT 28. The magnetic head part 100 has a structure which the reading head 90 and the recording head 91 are stacked.

The reading head 90 reads magnetic data, recorded on the magnetic recording medium (a later-described hard disk) 202. The reading head 90 has an MR device 5, arranged near the ABS 101, for detecting a magnetic signal. The reading head 90 comprises a lower shield layer 3, a lower shield gap film 4, an upper shield gap film 6 and an upper shield layer 7.

Then, an insulating layer 2 is further formed on a thin-film laminated surface 111a of the slider-substrate 110, and the lower shield layer 3 made of a magnetic material is formed on the insulating layer 2. The lower shield gap film 4 as an insulating film is further formed on the lower shield layer 3, and the upper shield gap film 6 shielding the MR device 5 is formed on the lower shield gap film 4. The upper shield layer 7 made of a magnetic material is formed on the upper shield gap film 6, and an insulating layer 8 is formed on the upper shield layer 7.

The MR device 5 is constituted by a magnetosensitive film exhibiting a magnetoresistive effect, such as AMR (anisotropic magnetoresistive), GMR (giant magnetoresistive), and TMR (tunneling magnetoresistive) devices.

The recording head 91 has an electromagnetic coil device for recording magnetic data. The electromagnetic coil device includes a thin-film coil 12, a return magnetic layer 20, a core layer 25, a lower dielectric-layer 24, an upper dielectric-layer 26, an overcoat layer 34, a main magnetic pole layer 40, and a linking magnetic pole layer 45, and has a structure in which they are stacked on the thin-film laminated surface 111a.

The thin-film coil 12 has four turn parts. The thin-film coil 12 is wound like a flat spiral about a later-described yoke magnetic pole layer 42 of the main magnetic pole layer 40.

The four turn parts are arranged at respective positions having different distances from the ABS 101. Among them, the turn part 12D is a part arranged at a position most distant from the ABS 101 among the four turn parts of the thin-film coil 12. The four turn parts are insulated from each other by a photoresist 13.

When a current modulated according to data to be recorded on the magnetic recording medium flows through the thin-film coil 12, the current causes the thin-film coil 12 to generate a recording magnetic field.

The return magnetic pole layer 20 has a connecting magnetic pole layer 21, and a rear magnetic pole layer 22. The connecting magnetic pole layer 21 has a magnetic pole end face 21a arranged within the ABS 101 and has a portion that is more distant from the ABS 101 than is the magnetic pole end face 21a being embedded in the insulating layer 8. The connecting magnetic pole layer 21 has a size reaching a position more distant from the ABS 101 than is the turn part 12D. To the connecting magnetic pole layer 21, the rear magnetic pole layer 22 is joined at a position more distant from the ABS 101 than is the turn part 12D.

The rear magnetic pole layer 22 is arranged at a position more distant from the ABS 101 than is the turn part 12D, and is joined to the connecting magnetic pole layer 21 and the later-described linking magnetic pole layer 45.

The return magnetic pole layer 20 is provided to return a magnetic flux to the main magnetic pole layer 40. When a magnetic flux generated by the recording magnetic field is emitted from a later-described magnetic pole end face 41g of the main magnetic pole layer 40 to the magnetic recording medium, the magnetic flux flows back to the return magnetic pole layer 20 via the magnetic recording medium (a not-depicted soft magnetic layer in detail). This magnetic flux passes through the linking magnetic pole layer 45 and reaches the main magnetic pole layer 40.

The core layer 25 is a wave guide which guides laser light, generated by the later-described laser diode 130 of the light source-unit 160, from the light source-opposing surface 102 to the ABS 101. The core layer 25, as illustrated in FIG. 4, is formed along with a depth direction, passing through between the linking magnetic pole layer 45, from the ABS 101 to the light source-opposing surface 102.

The core layer 25 is formed with dielectric such as tantalum oxide ($TaO_x$) or the like. For example, the core layer 25 is able to be formed with $Ta_2O_5$ (for example, the refractive index is about 2.16).

The core layer 25 is formed so as to be accommodated in a later-described concave part 26c of the upper dielectric-layer 26, on an upper surface 24d of the lower dielectric-layer 24. Further, an upper surface 25d and both side surfaces, of the core layer 25, are in contact with the upper dielectric-layer 26, and a lower surface 25e, of the core layer 25, is in contact with the lower dielectric-layer 24.

Then, the upper dielectric-layer 26 and the lower dielectric-layer 24 are arranged in the surrounding of the core layer 25, the cladding layer is constituted by the upper dielectric-layer 26 and the lower dielectric-layer 24.

The upper dielectric-layer 26 is formed in a substantially flat plate shape having a width larger than the width of the magnetic pole end part layer 41. The upper dielectric-layer 26 is formed with dielectric, having the lower refractive index than the core layer 25, for example, such as aluminum oxide ($AlO_x$) or the like. For example, the upper dielectric-layer 26 is able to be formed with alumina ($Al_2O_3$, for example, the refractive index is about 1.63). Then, the concave part 26c is formed on the lower surface 26e of the upper dielectric-layer 26, the core layer 25 is accommodated in the concave part 26c.

The lower dielectric-layer 24 is formed so as to be in contact with the lower surface 25e of the core layer 25 and the lower surface 26e of the upper dielectric-layer 26. The lower dielectric-layer 24 is able to be formed with dielectric such as aluminum oxide ($AlO_x$) or the like, similar with the upper dielectric-layer 26.

For example, the lower dielectric-layer 24 is able to be formed with alumina ($Al_2O_3$).

The near-field light generating layer (near field transducer, referred to as an "NFT") 28 generates near-field light for heating the hard disk 202. The NFT 28 has a structure formed in a rectangular shape as a whole, seen from the ABS 101.

The NFT 28 is made of metal and formed of, for example, one of Au, Ag, Al, Cu, Pd, Pt, Rh, Ir or an alloy made of a plurality of those elements.

The NFT 28 is a member having a thick plate-like shape, as illustrated in FIG. 9, the NFT 28 has a PEG 31 and a variable width part 32.

The PEG 31 is a protruding end-part, according to the present invention, and it is formed on the side of the ABS 101 of the variable width part 32. The part, having the narrowest width in the NFT 28, and protruding toward the ABS 101, is the PEG 31.

The PEG 31 has a PEG end-surface 33, arranged in the ABS 101. As also illustrated in FIG. 5, the PEG end-surface 33 is formed in a rectangular shape in the ABS 101. Further, as illustrated in FIG. 9, the PEG 31 has a pair of PEG side-surfaces 33a, 33b, which is extending along a direction intersecting the ABS 101 (also referred as intersecting direction) from the PEG end-surface 33. Note that the PEG end-surface 33 is able to be formed in a shape, being different from the rectangular shape, such as a circular shape, triangle shape or the like.

The main magnetic pole layer 40 has the magnetic pole end part layer 41 and the yoke magnetic pole layer 42. The magnetic pole end part layer 41 and the yoke magnetic pole layer 42 have a symmetrical structure formed to be bilaterally symmetrical about a magnetic pole end surface 41g.

The magnetic pole end surface 41g is arranged within the ABS 101. The yoke magnetic pole layer 42 is joined to an upper surface 41e of the magnetic pole end part layer 41.

The yoke magnetic pole layer 42 has a rear magnetic pole layer 42a, a middle magnetic pole layer 42b, and a front magnetic pole layer 42c. The yoke magnetic pole layer 42 has a curved structure extending from the ABS 101 in the depth direction and leading to the linking magnetic pole layer 45 straddling the thin-film coil 12.

The rear magnetic pole layer 42a is arranged at a position more distant from the ABS 101 than are the four turn parts of the thin-film coil 12. The rear magnetic pole layer 42a has a lateral width larger than that of the middle magnetic pole layer 42b (the largest lateral width in the yoke magnetic pole layer 42) and is joined to the linking magnetic pole layer 45. The middle magnetic pole layer 42b is arranged above the thin-film coil 12. The middle magnetic pole layer 42b is connected to the rear magnetic pole layer 42a and the front magnetic pole layer 42c. The middle magnetic pole layer 42b has a lateral width gradually getting smaller as it approaches to the ABS 101. The front magnetic pole layer 42c is formed in a downward curved structure getting closer to the magnetic pole end part layer 41 as it approaches to the ABS 101. The front magnetic pole layer 42c is joined to the front surface 41e of the magnetic pole end part layer 41.

The linking magnetic pole layer 45 is arranged in a manner to hold the core layer 25 from both right and left sides at a position more distant from the ABS 101 than is the thin-film coil 12. Further, the linking magnetic pole layer 45 is joined to the rear magnetic pole layer 22. The linking magnetic pole layer 45 magnetically links the return magnetic pole layer 20 to the main magnetic pole layer 40, and has a role of returning, to the main magnetic pole layer 40, the magnetic flux flown back to the return magnetic pole layer 20.

(Stabilized Protective Film and Reading Head Protective Film)

Then, as illustrated in FIGS. 2, 3, 6-8 in detail, the magnetic head part 100 has the stabilized protective film 60 and the reading head protective film 70. The stabilized protective film 60 is formed in the recording area 103. The reading head protective film 70 is formed in the reading area 104.

The recording area 103 is a part of the ABS 101, and it is an area in which the recording head 91 and the NFT 28 are included. The reading area 104 is a part of the ABS 101, and it is an area in which the reading head 90 is included.

As illustrated in FIGS. 6, 7, 8 in detail, a boundary part B is located in the magnetic head part 100, in thermally assisted magnetic head 180. The boundary part B is a part corresponding to a boundary between the recording area 103 and the reading area 104. The boundary part B is located in a neighborhood of the insulating layer 8 between the MR device 5 and the NFT 28 in the ABS 101. The area, which is nearer to the recording head 91 than the boundary part B, is the recording area 103. The area, which is nearer to the MR device 5 than the boundary part B, is the reading area 104. Note that the boundary part B is located in the neighborhood of the insulating layer 8 though in this embodiment, the boundary part B is able to be located in the other area.

Concerning the stabilized protective film 60, a protective level is enhanced so that the recording head 91 and the NFT 28, arranged in the recording area 103, are effectively protected (especially, deformation and recession of the PEG 31 do not occur). Besides, concerning the stabilized protective film 60, crystal structure is stabilized so as not to change, even if temperature rise occurs. The stabilized protective film 60 has a seed layer 61 and a double protective layer 64 so that the protective level is enhanced than the conventional protective film, thereby the stabilized protective film 60 has a high protective level.

As illustrated in FIGS. 7, 8 in detail, the double protective layer 64 has a two-layers structure which a YSZ protective layer 62 and a hard protective layer 63 are laminated. The double protective layer 64, having the two-layers structure made of the YSZ protective layer 62 and hard protective layer 63, is laminated on the seed layer 61. Therefore, the stabilized protective film 60 has a three-layer structure which the three layers are laminated, as a whole.

The seed layer 61 is formed with a material having high fracture toughness (in this embodiment, silicon nitride ($SiN_x$)), and it has a thickness of about 20 Å. The seed layer 61 is able to be formed with $SiO_x$, $SiO_xN_y$, $SiC_x$, $SiC_xN_y$, $SiC_xO_yN_z$.

The double protective layer 64 is formed on the seed layer 61 (surface of the seed layer 61). As illustrated in FIGS. 7, 8, the double protective layer 64 has the two-layers structure which the two protective layers, having different material and thickness (the YSZ protective layer 62 and hard protective layer 63), are laminated. The hard protective layer 63 is formed on the YSZ protective layer 62. The YSZ protective layer 62 is formed on the seed layer 61.

The YSZ protective layer 62 is formed with yttria-stabilized zirconia (hereinafter, referred to also as a "YSZ"). YSZ includes crystal structure which is tetragonal or cubic crystal from low temperature to high temperature, and it includes a stabilized crystal structure. Therefore, in YSZ, phase transition, caused by temperature change, and an appearance of crack, caused by phase transition, are suppressed. Zirconium oxide is a material having high melting point and small thermal conductivity though, because phase transition, caused by temperature rise, occurs, crystal structure is not stable. Therefore, in case of the protective film, made of zirconium oxide, the appearance of crack is likely to occur by temperature rise due to Media back heating. On this point, in YSZ, divalent or trivalent metal oxide (yttrium oxide ($Y_2O_3$), in this embodiment) is added to zirconium oxide as a stabilizer, thereby crystal structure is stabilized so as not to occur phase transition. Therefore, in the YSZ protective layer 62, the appearance of crack, caused by temperature rise due to Media back heating, never occurs. The YSZ protective layer 62 has a thickness of about 20 Å. Besides, a Y/(Y+Zr) ratio is set in a range of between 5 to 30, in the YSZ protective layer 62. The Y/(Y+Zr) ratio means a ratio of molecular weight of yttrium in the yttrium oxide to molecular weight of yttrium in the yttrium oxide and zirconium in the zirconium oxide, in this embodiment.

The hard protective layer 63 is formed with the material whose hardness is higher than the YSZ protective layer 62, and the material has excellent wear resistance (in this embodiment, DLC (Diamond Like Carbon)). The hard protective layer 63 has a thickness of about 14 Å. The thicknesses of the YSZ protective layer 62 and the hard protective layer 63 are smaller than the thickness of the later-described reading head protective film 70.

Then, the reading head protective film 70 has a structure which conform to protection of the reading head 90, arranged in the reading area 104 (a structure which the reading head 90 is protected so that the magnetic data reading sensitivity does not lower). The reading head protective film 70 is formed with a material having high hardness and excellent wear resistance (in this embodiment, DLC). The reading head protective film 70 is formed with material in common with the hard protective layer 63. The reading head protective film 70 has a thickness of about 24 Å which is larger than the hard protective layer 63 being formed with the same material, so as to secure the protective level having no lowering of magnetic data reading sensitivity. Because the reading head protective film 70 is formed with only one layer made of DLC, it has a single-layer structure.

In this embodiment, as illustrated in FIGS. 1, 2, the reading head protective film 70 is formed not only on the reading area 104 but also on a surface 112, of the slider-substrate 110, on the side of the ABS 101 (also called, ABS-side surface). The reading head protective film 70 is able to be formed only on the reading area 104 of the magnetic head part 100. The reading head protective film 70 is able to be formed on a part or the whole of the ABS-side surface 112, in addition to the reading area 104. In FIG. 2, the reading head protective film 70 is formed on the ABS-side surface 112 though, it is possible that the stabilized protective film 60 is formed on the part, of the ABS-side surface 112, except for the reading area 104 (not illustrated).

Then, the thickness of stabilized protective film 60 (adding thickness of the seed layer 61, the YSZ protective layer 62 and the hard protective layer 63) is about 54 Å, thickness of the reading head protective film 70 is about 24 Å. Because the thickness of the reading head protective film 70 is thinner (smaller) than that of the stabilized protective film 60, the magnetic head part 100 has a thickness difference structure, according to the embodiment of the present invention.

Further, as illustrated in FIG. 8, in detail, a surface 70a of the reading head protective film 70 recedes from a surface 60a of the stabilized protective film 60, originated in the thickness difference between the stabilized protective film 60 and the reading head protective film 70. Therefore, the magnetic head part 100 has a protective film step 60*t*. The protective film step 60*t* is formed in the boundary part B.

Further, because the seed layer 61 and the YSZ protective layer 62, of the stabilized protective film 60, are joined to the reading head protective film 70 in the boundary part B, a plurality of protective films, having different material and thickness, are joined in the boundary part B.

An end surface 62*s* of the YSZ protective layer 62 and an end surface 63*s* of the hard protective layer 63 are exposed in the protective film step 60*t*, in the boundary part B.

(Light Source-Unit)

Subsequently, the light source-unit 160 will be explained with mainly reference to FIG. 1 to FIG. 4. The light source-unit 160 has the laser diode 130 and a sub-mount 150.

The laser diode 130 has an n-substrate 140, an n-electrode 141, a light emitting layer 145, and a p-electrode 142, and has a rectangle parallelepiped shape, as illustrated in FIG. 4. In addition, the n-electrode 141 is joined on a surface on the outside of the n-substrate 140. Further, the light emitting layer 145 is formed on a side of the n-substrate 140 opposite to the n-electrode 141, and the p-electrode 142 is joined on the light emitting layer 145, via a ground layer 143.

The light emitting layer 145 has an active layer 146, an n-cladding layer 147, and a p-cladding layer 148, and has a structure in which the active layer 146 is sandwiched between the n-cladding layer 147 and the p-cladding layer 148.

Then, the laser diode 130 is joined to the sub-mount 150 so that the active layer 146 opposes to the core layer 25, and an emitting part is arranged in a part, of the light emitting layer 145, opposing to the core layer 25. The emitting part is a part, of the laser diode 130, which emits the laser light.

The sub-mount 150 is made of a ceramic material such as aluminum oxide-titanium carbide ($Al_2O_3 \cdot TiC$) or the like, and is formed in a rectangular parallelepiped shape. The sub-mount 150 has a size larger than the laser diode 130. Further, the sub-mount 150 is able to be formed with semiconductor material such as Si, GaAs, SiC or the like.

The sub-mount 150 is joined on the light source placing surface 111 of the slider-substrate 110, and the laser diode 130 is joined on a laser fixing surface 151 intersecting with the junction surface.

(Method of Manufacturing the Stabilized Protective Film and Reading Head Protective Film)

Next, a method of manufacturing the stabilized protective film 60 and the reading head protective film 70, on the magnetic head part 100, will be explained with reference to FIG. 15 to FIG. 18. FIG. 15 to FIG. 18 are sectional views, corresponding to FIG. 8, showing steps of manufacturing the stabilized protective film 60 and the reading head protective film 70 on the magnetic head part 100. Note that upper side and lower side are exchanged for convenience of illustration as compared with FIG. 8, in FIG. 15 to FIG. 18.

Figure 15:
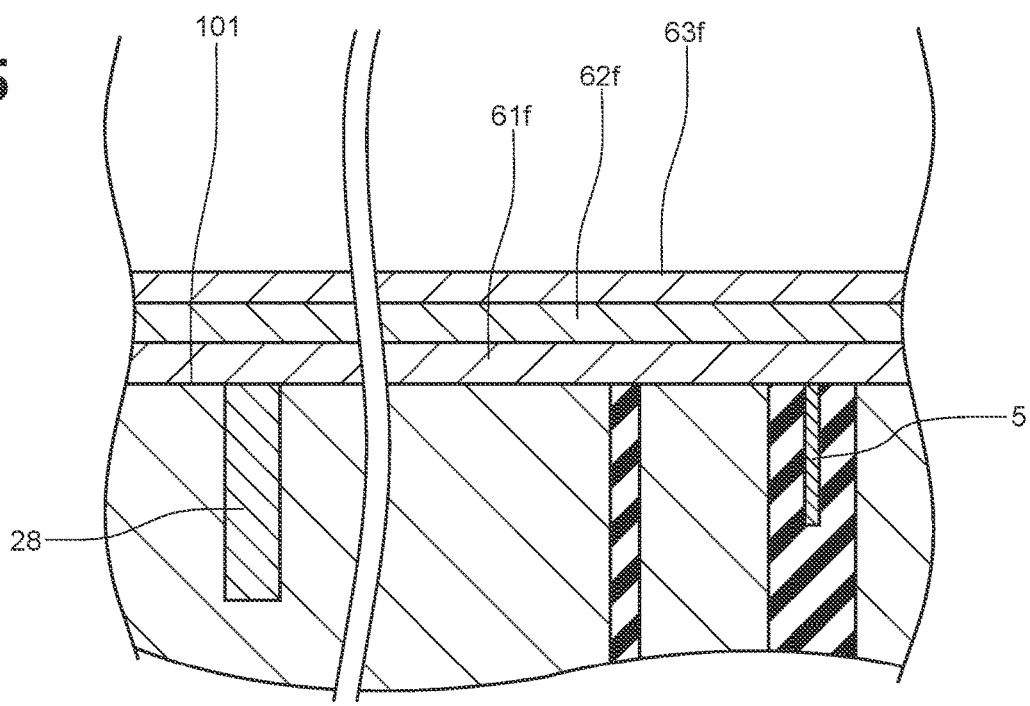
FIG. 15 is a sectional view, corresponding to FIG. 8, showing a step of manufacturing a stabilized protective film and a reading head protective film on the magnetic head part, in the thermally assisted magnetic head according the present invention.

At first, as illustrated in FIG. 15, a seed layer 61*f*, a YSZ protective layer 62*f* and a hard protective layer 63*f* are formed sequentially on the whole of the ABS-side surface 112 including the ABS 101 (the ABS-side surface 112 is not illustrated in FIGS. 15-18). Because the seed layer 61 is formed with the seed layer 61*f* afterward, the seed layer 61*f* is formed with a material having high fracture toughness (in this embodiment, silicon nitride ($SiN_x$)), and it is formed in a thickness of about 20 Å. Because, the YSZ protective layer 62 and the hard protective layer 63 are respectively formed with the YSZ protective layer 62*f* and the hard protective layer 63*f* afterward, the YSZ protective layer 62 and the hard protective layer 63 are respectively formed with the above-described materials, and they are formed in above-described thicknesses.

Figure 16:
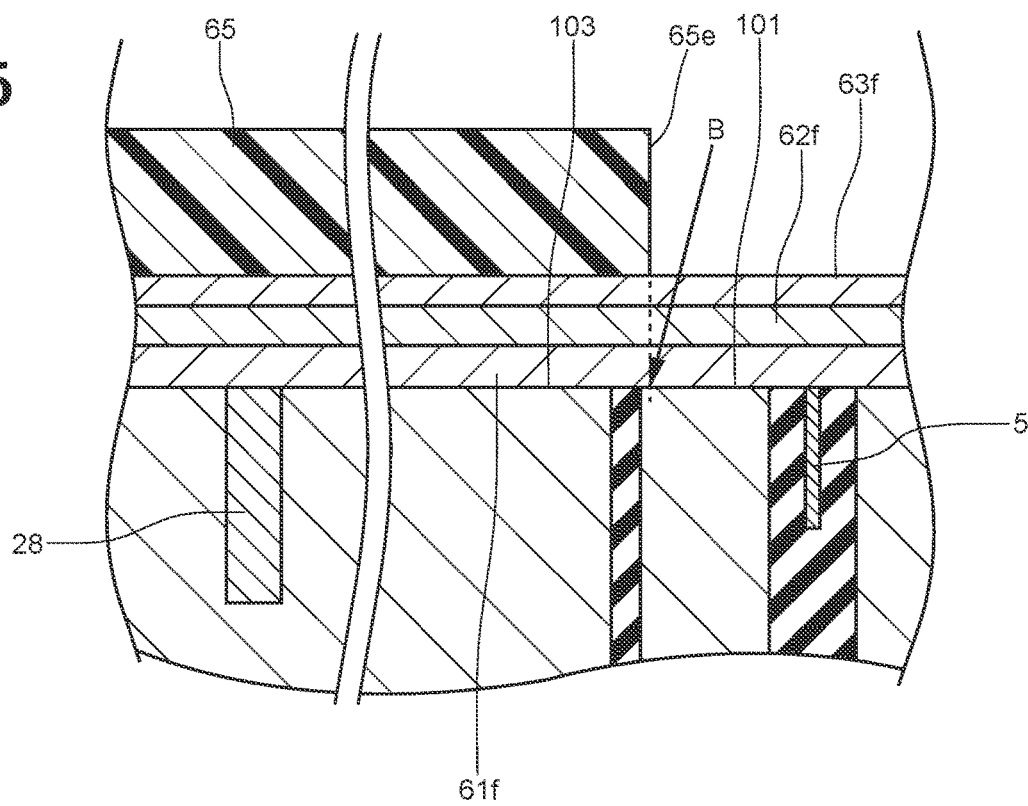
FIG. 16 is a sectional view showing a step subsequent to that in FIG. 15.

Next, photoresist is applied to the ABS-side surface 112 including the ABS 101. After that, as illustrated in FIG. 16, a patterning with not-illustrated photomask is performed to form a resist pattern 65 on the recording area 103. A part, which an end part 65*e* of the resist pattern 65 is arranged, becomes the boundary part B afterward.

Figure 17:
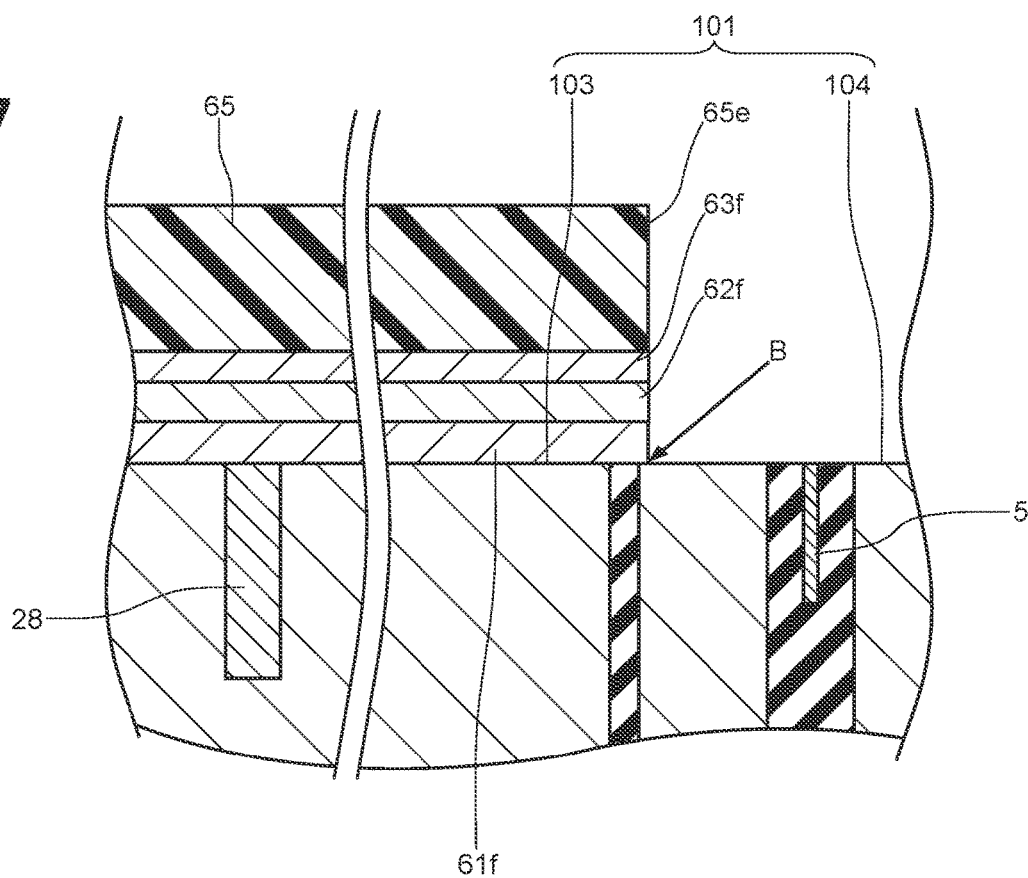
FIG. 17 is a sectional view showing a step subsequent to that in FIG. 16.

Subsequently, as illustrated in FIG. 17, etching is performed for the ABS-side surface 112 including the ABS 101. Thereby, parts, which the resist pattern 65 does not cover, of the seed layer 61*f*, the YSZ protective layer 62*f* and the hard protective layer 63*f* are removed. The part, which the seed layer 61*f*, the YSZ protective layer 62*f* and the hard protective layer 63*f* are removed, of the ABS 101 becomes the reading area 104.

Figure 18:
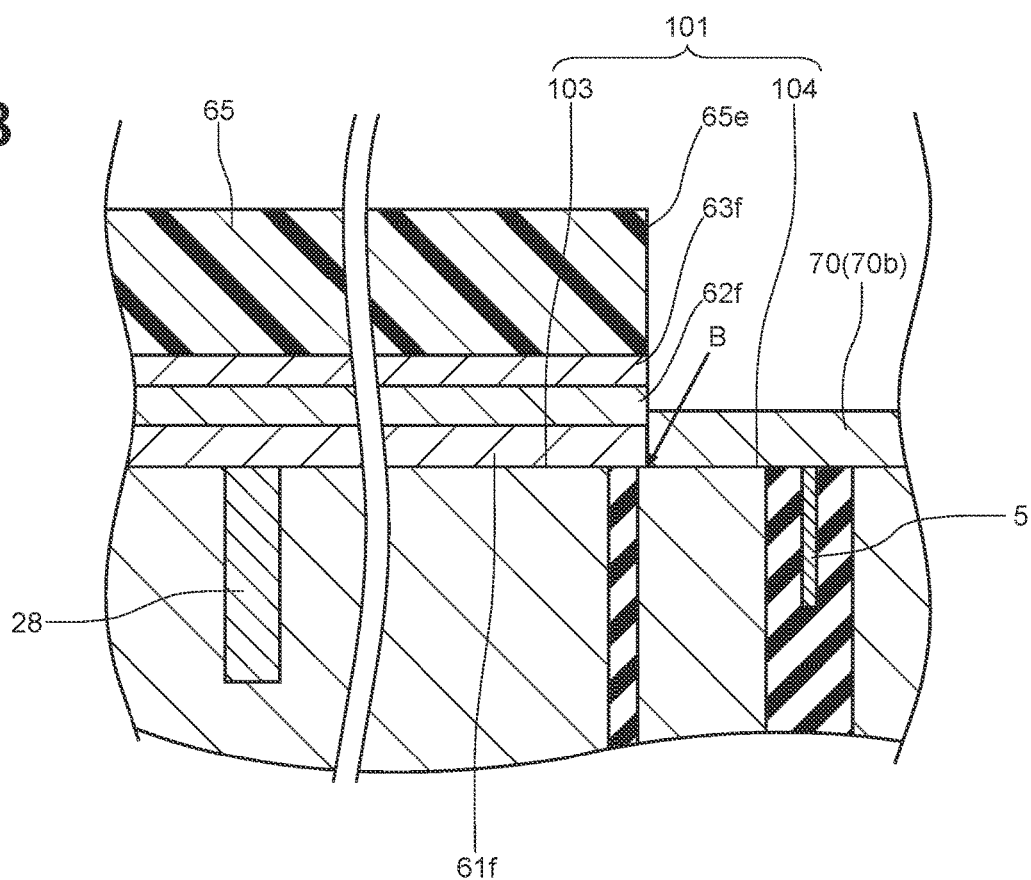
FIG. 18 is a sectional view showing a step subsequent to that in FIG. 17.

Then, as illustrated in FIG. 18, a single-layered coating film 70*b* is formed in the part which the seed layer 61*f*, the YSZ protective layer 62*f* and the hard protective layer 63*f* are removed. The single-layered coating film 70*b* is formed with a material having high hardness and excellent wear resistance (in this embodiment, DLC). The reading head protective film 70 is formed with the single-layered coating film 70*b*. After that, the resist pattern 65 is removed. Then, the stabilized protective film 60 is formed with the left parts of the seed layer 61*f*, the YSZ protective layer 62*f* and the hard protective layer 63*f*.

(Operation and Effect of the Thermally Assisted Magnetic Head 180)

As described above, in the thermally assisted magnetic head 180, the ABS 101 includes the recording area 103 and the reading area 104, and the stabilized protective film 60, the reading head protective film 70 are respectively formed in the recording area 103, the reading area 104. As illustrated in FIG. 6, the recording head 91 and the NFT 28 are included in the recording area 103, the stabilized protective film 60 is formed so as to cover the recording head 91 and the NFT 28.

The stabilized protective film 60 has a structure which the recording head 91 and the NFT 28 are effectively and surely protected.

At first, the stabilized protective film 60 includes the seed layer 61. Because the seed layer 61 is formed with the material having high fracture toughness, the seed layer 61 exhibits patience when a dynamic load is applied from the outside. Therefore, protective function, of the double protective layer 64 (the YSZ protective layer 62 and the hard protective layer 63), is exhibited effectively, thereby the protective function of the stabilized protective film 60 is enhanced. Further, adhesion of the double protective layer 64, to the recording area 103, is enhanced by the seed layer 61. The seed layer 61 is included in the stabilized protective film 60, thereby protective level of the stabilized protective film 60 is enhanced.

Then, the double protective layer 64 has a structure which the YSZ protective layer 62 and the hard protective layer 63, namely two layers are laminated. The YSZ protective layer 62 and the hard protective layer 63 respectively have different material and thickness. Therefore, the double protective layer 64 combined the different protective functions of the YSZ protective layer 62 and the hard protective layer 63, thereby the stabilized protective film 60 includes excellent protective level.

The YSZ protective layer 62 includes a material having high melting point and small thermal conductivity (in this embodiment, zirconium oxide, ($ZrO_x$)). Therefore, thermal resistance, of the recording area 103, inside than the YSZ protective layer 62 is enhanced by the YSZ protective layer 62, the recording head 91, the PEG 31 are effectively protected from temperature rise, caused by the Media back heating. Therefore, deformation and recession of the PEG 31 are prevented.

Especially, the YSZ protective layer 62 is formed with YSZ though, phase transition, caused by temperature change, is suppressed, thereby crystal structure is stabilized, in YSZ. Therefore, even if temperature rise due to Media back heating occurs, the appearance of crack never occurs in the YSZ protective layer 62. Therefore, deformation and recession of the PEG 31 are more effectively prevented by the YSZ protective layer 62 than the protective film formed with zirconium oxide ($ZrO_x$).

Further, because the hard protective layer 63 is formed with a material having high hardness and excellent wear resistance (in this embodiment, DLC), the hard protective layer 63 has high hardness and high were resistance, and has lower friction, chemical stability and lower adhesion. Therefore, hardness and wear resistance of the recording area 103 are enhanced by the hard protective layer 63. Because the hard protective layer 63 is arranged outside, especially the recording head 91 and the NFT 28 are effectively protected from a damage when the ABS 101 is in contact with the hard disk 202.

On the other hand, the reading head protective film 70 has the protective level with an extent which the magnetic data reading sensitivity does not lower. The reading head protective film 70 is one layer with DLC, and it has a different layer structure with the stabilized protective film 60.

The recording head 91 and the PEG 31 are not included in the reading area 104. Therefore, high protective level, as the stabilized protective film 60 which is formed in the recording area 103, is not needed in the reading head protective film 70.

The reading head 90 is included in the reading area 104. Therefore, it is sufficient that the reading head protective film 70 has the protective level with an extent which the magnetic data reading sensitivity of the reading head 90 (MR device 5) does not lower. In this point, in case of the film of three-layer structure, such as the stabilized protective film 60, the protective level of the film is a high level beyond the necessity, the magnetic data reading sensitivity of the reading head 90 (MR device 5) lowers, when the protective film of three-layer structure, such as the stabilized protective film 60, is formed. Therefore, layer structure of the reading head protective film 70 must be simplified.

At first, when the thickness of the reading head protective film 70 is thinner than that of the stabilized protective film 60, the protective level of the reading head protective film 70 becomes lower. Therefore, the reading head protective film 70 includes the thickness which is thinner than the stabilized protective film 60. Further, only one layer with DLC, similar with the hard protective layer 63, supposes to be formed in the reading area 104, without forming the seed layer 61 and the YSZ protective layer 62 like the stabilized protective film 60. Because the layer is formed with DLC, hardness and wear resistance of the reading area 104 is enhanced. Further, thermal resistance and fracture toughness are gained to a certain extent even with DLC to protect effectively (with an extent which the magnetic data reading sensitivity does not lower) reading head 90. On the other hand, when the thickness of the layer is larger than that of the hard protective layer 63, the desired protective level is secured.

Then, the reading head protective film 70 is formed with DLC, similar with the hard protective layer 63 though, the thickness of the reading head protective film 70 is enlarged than the hard protective layer 63. Thereby, the reading head protective film 70 has the protective level with an extent which the magnetic data reading sensitivity does not lower.

As described above, the thermally assisted magnetic head 180 includes the structure which is different from the conventional thermally assisted magnetic head having the uniform protective film on the ABS, thereby the above-described both A) and B) are achieved.

Namely, in the thermally assisted magnetic head 180, the ABS 101 is subdivided into the recording area 103 and the reading area 104 in accordance with the necessary protective level, and the stabilized protective film 60 and the reading head protective film 70 are formed in the respective areas. Thereby the above-described both A) and B) are achieved.

Then, the magnetic head part 100 has the thickness difference structure, concerning the stabilized protective film 60 and the reading head protective film 70, the thickness of the stabilized protective film 60 is larger than that of the reading head protective film 70. Thereby, the protective level of the stabilized protective film 60 is surely secured, in the magnetic head part 100.

Further, the hard protective layer 63 is formed with a material having high hardness and excellent wear resistance (in this embodiment, DLC), the reading head protective film 70 is also formed with material which is the same as the hard protective layer 63. The hard protective layer 63, the reading head protective film 70 are respectively arranged outside the recording area 103, the reading area 104. Thereby, the whole of the ABS 101, in the magnetic head part 100, is protected from contact with the magnetic recording medium (hard disk 202).

Modified Example

Figure 10:
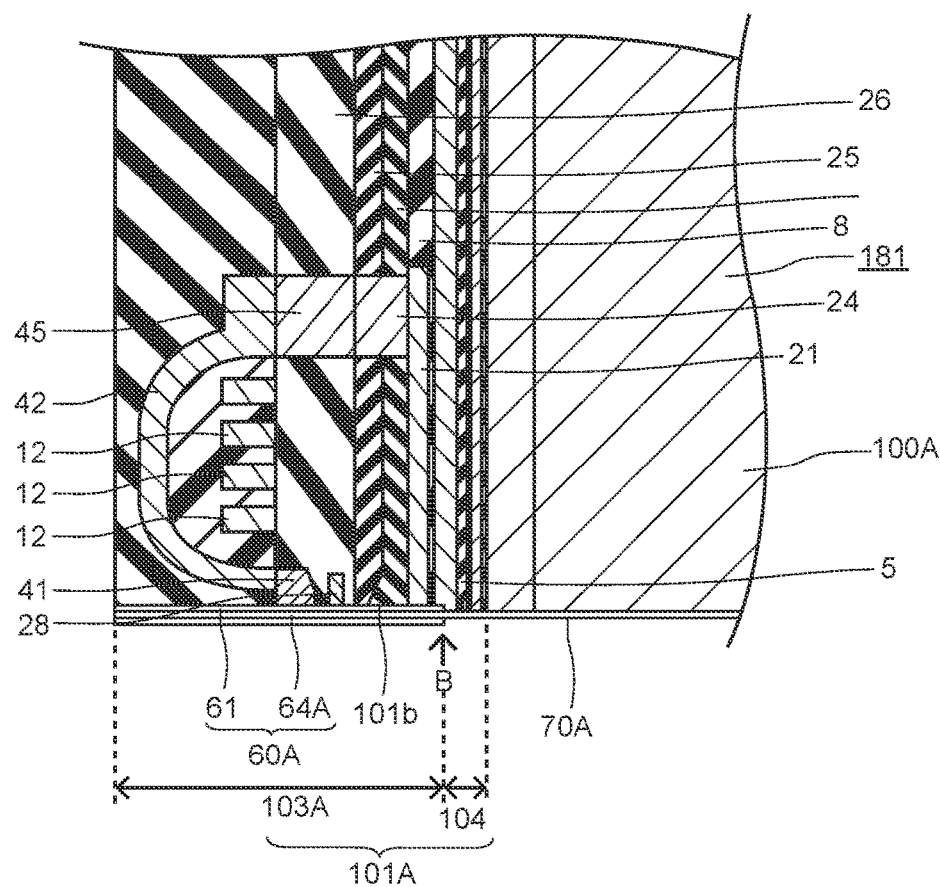
FIG. 10 is a sectional view, corresponding to FIG. 6, of the thermally assisted magnetic head according to a modified example.
Figure 11:
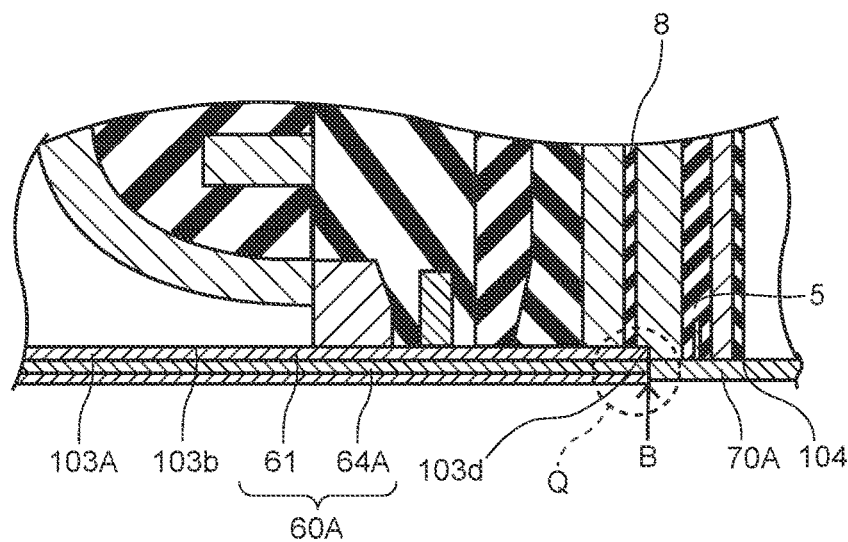
FIG. 11 is a sectional view, corresponding to FIG. 7, of the thermally assisted magnetic head according to the modified example.
Figure 12:
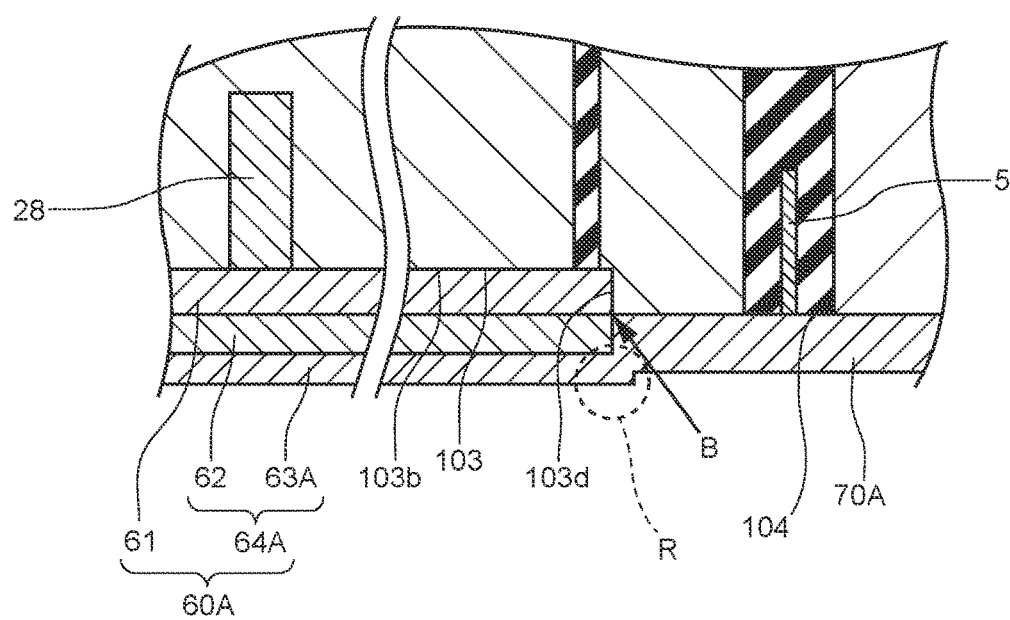
FIG. 12 is a sectional view, corresponding to FIG. 8, of the thermally assisted magnetic head according to the modified example.
Figure 13:
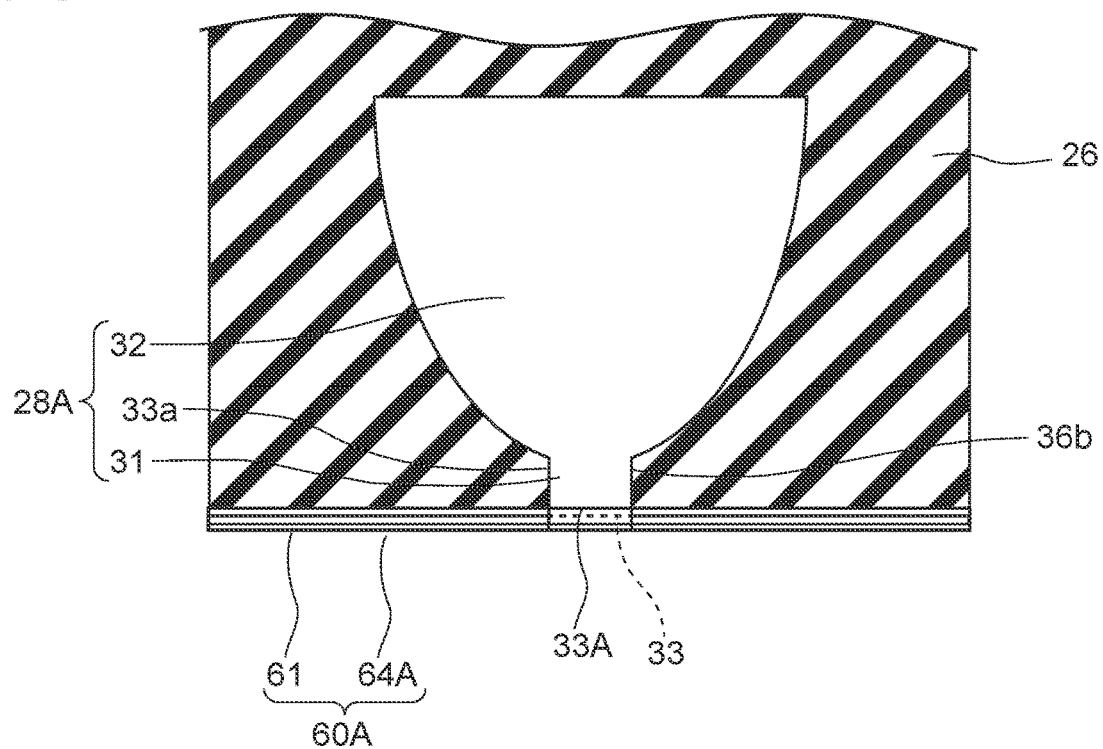
FIG. 13 is a sectional view, corresponding to FIG. 9, of the thermally assisted magnetic head according to the modified example.
Figure 14:
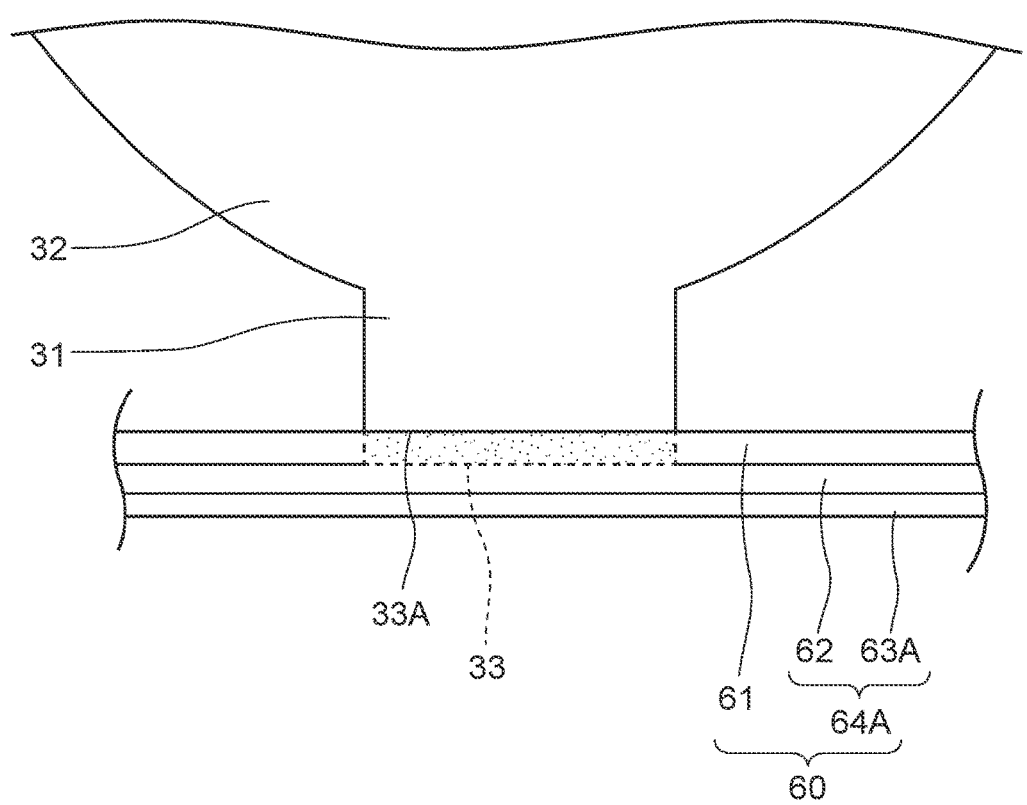
FIG. 14 is a plan view, with enlargement, of the principal part partially omitted in FIG. 13.

Subsequently, a thermally assisted magnetic head 181 according to the modified example will be explained with reference to FIG. 10 to FIG. 14. FIG. 10 is a sectional view, corresponding to FIG. 6, of the thermally assisted magnetic head 181, FIG. 11 is a sectional view, corresponding to FIG. 7, in the same way, FIG. 12 is a sectional view, corresponding to FIG. 8, in the same way. FIG. 13 is a plan view, corresponding to FIG. 9, in the same way, FIG. 14 is a plan view, with enlargement, of the principal part partially omitted in FIG. 13.

The thermally assisted magnetic head 181 is different in that it has a magnetic head part 100A in place of the magnetic head part 100, as compared with the above-described thermally assisted magnetic head 180. The magnetic head part 100A is different in that it has an ABS 101A in place of the ABS 101, and an stabilized protective film 60A and a reading head protective film 70A are formed in place of the stabilized protective film 60 and the reading head protective film 70, as compared with the magnetic head part 100.

Then, the ABS 101A is different in that it has a recording area 103A in place of the recording area 103, as compared with the ABS 101.

As illustrated in FIG. 11, FIG. 12, the recording area 103A is different in that a recess concave part 103b is formed in the ABS 101A, as compared with the recording area 103. The ABS 101 of the above-described thermally assisted magnetic head 180 is flat, there is no step between the recording area 103 and the reading area 104. On the other hand, because the recess concave part 103b is formed in the ABS 101 A, there is a step between the recording area 103A and the reading area 104, therefore the ABS 101A is not flat.

The recess concave part 103*b* is formed by removing a part of the ABS 101 with predetermined depth (describe later in detail).

Further, because the recess concave part 103*b* is formed in the ABS 101A, the recording area 103A recedes in the size of a step 103*d* from the reading area 104. Because the step 103*d* is formed in the recording area 103A, the ABS 101A includes a step-ABS structure according to the embodiment of the present invention.

Then, because the recess concave part 103*b* is formed in the recording area 103A, as illustrated in FIG. 13, FIG. 14, thermally assisted magnetic head 181 has a NFT 28A in place of the NFT 28.

As illustrated in FIG. 9, in case of the above-described NFT 28, because the PEG 31 is arranged in the ABS 101 (recording area 103), the PEG end-surface 33 is exposed in the ABS 101.

On the other hand, in case of the magnetic head part 100A, a part of the ABS 101 (recording area 103) is removed when the recess concave part 103*b* is formed. On that occasion, the PEG 31 is removed partially (an area with dot in FIG. 14). Therefore, a PEG end-surface 33A, which recedes in the size of the step 103*d* from the PEG end-surface 33 of the PEG 31, is exposed in the ABS 101A, the PEG end-surface 33A is arranged in the ABS 101A (recording area 103A). Further, the PEG 31 is removed partially, thereby sizes of the PEG side-surfaces 33*a*, 33*b* are also reduced. The PEG end-surface 33A is arranged in a bottom surface of the recess concave part 103*b*, illustrated in FIG. 11, FIG. 12. The bottom surface of the recess concave part 103*b* is a part which is arranged in the recording area 103A of the ABS 101A. The bottom surface of the recess concave part 103*b* is a recess surface according to the present invention.

As illustrated in FIG. 11, FIG. 12, the stabilized protective film 60A is different in that it has a double protective layer 64A in place of the double protective layer 64, the seed layer 61 is in contact with the reading area 104, because the seed layer 61 is formed in the recess concave part 103*b*. Further, the magnetic head part 100A has a flat structure which the surface of the seed layer 61 is connected to the surface of the reading head protective film 70A with no step, in the stabilized protective film 60A.

The double protective layer 64A is different in that a hard protective layer 63A is formed in place of the hard protective layer 63 as compared with the double protective layer 64. The hard protective layer 63A is different in that it is connected with the reading head protective film 70A in the boundary part B, both are in borderless condition. As illustrated in FIG. 12, there is no boundary between the hard protective layer 63A and the reading head protective film 70A, in the part shown by "R". Therefore, the magnetic head part 100A includes a series structure, according to the embodiment of the present invention.

The reading head protective film 70A is different in that it is connected with the hard protective layer 63A in the boundary part B, as compared the reading head protective film 70.

(Method of Manufacturing the Stabilized Protective Film and Reading Head Protective Film)

Next, a method of manufacturing the stabilized protective film 60A and the reading head protective film 70A, on the magnetic head part 100A, will be explained with reference to FIG. 19 to FIG. 22. FIG. 19 to FIG. 22 are sectional views, corresponding to FIG. 8, showing steps of manufacturing the stabilized protective film 60A and the reading head protective film 70A on the magnetic head part 100A. Note that upper side and lower side are exchanged for convenience of illustration, in FIG. 19 to FIG. 22.

Figure 19:
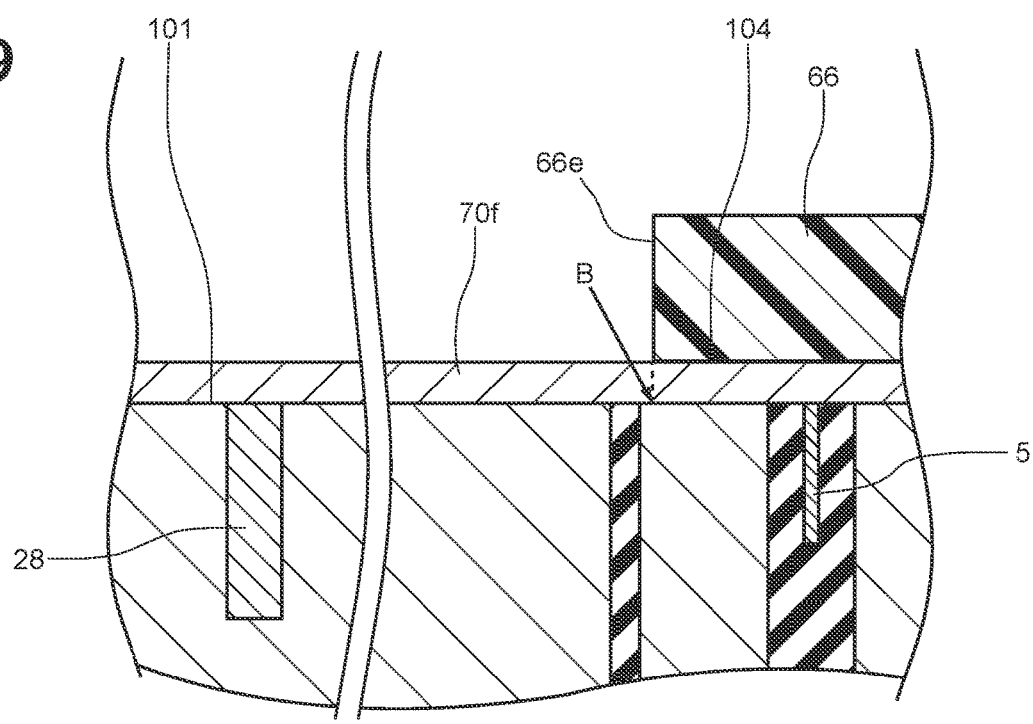
FIG. 19 is a sectional view, corresponding to FIG. 8, showing a step of manufacturing the stabilized protective film and the reading head protective film on the magnetic head part, in the thermally assisted magnetic head according the modified example.

As illustrated in FIG. 19, a single-layered coating film 70*f* is formed in the ABS 101. After that, photoresist is applied to the whole of the ABS 101, a patterning with not-illustrated photomask is performed to form a resist pattern 66 on the reading area 104, as illustrated in FIG. 19. A part, which an end part 66*e* of the resist pattern 66 is arranged, becomes the boundary part B afterward.

Figure 20:
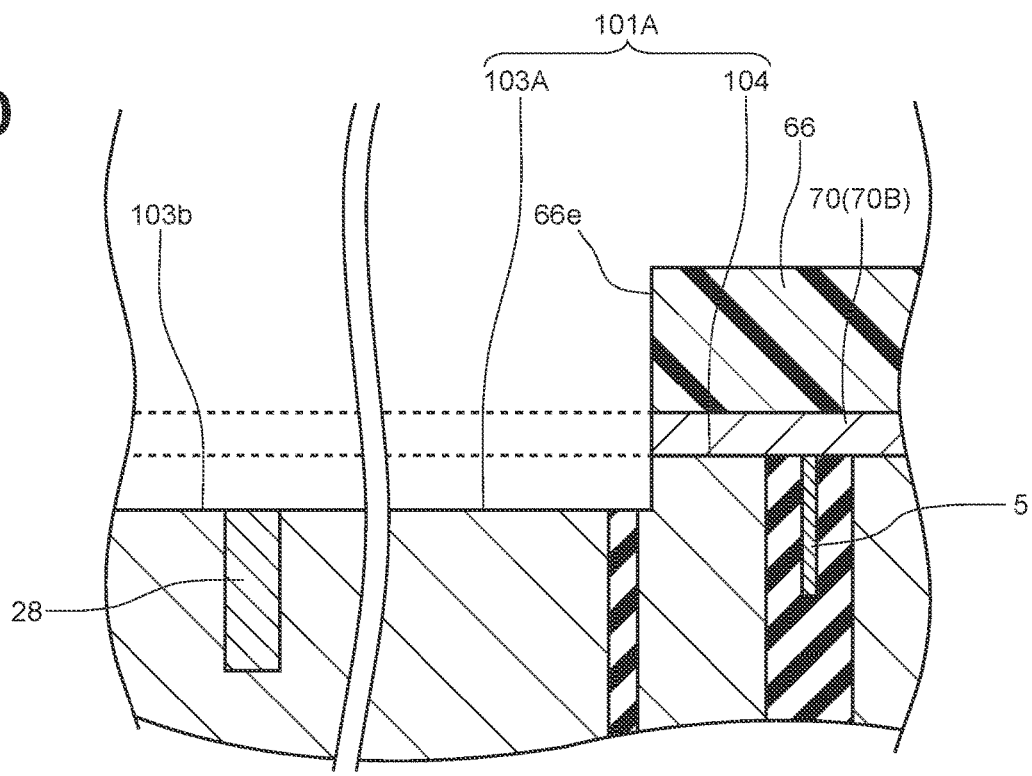
FIG. 20 is a sectional view showing a step subsequent to that in FIG. 19.

Subsequently, as illustrated in FIG. 20, etching is performed for the ABS 101 to remove parts, of the single-layered coating film 70*f*, the ABS 101, which the resist pattern 66 does not cover, are removed. The removed parts of the single-layered coating film 70*f* and the ABS 101, become the recording area 103A. Further, the remain part of the single-layered coating film 70*f* becomes the reading head protective film 70B. The recess concave part 103*b* is formed by removing part (depth 20A) of the ABS 101, in the recording area 103A.

Figure 21:
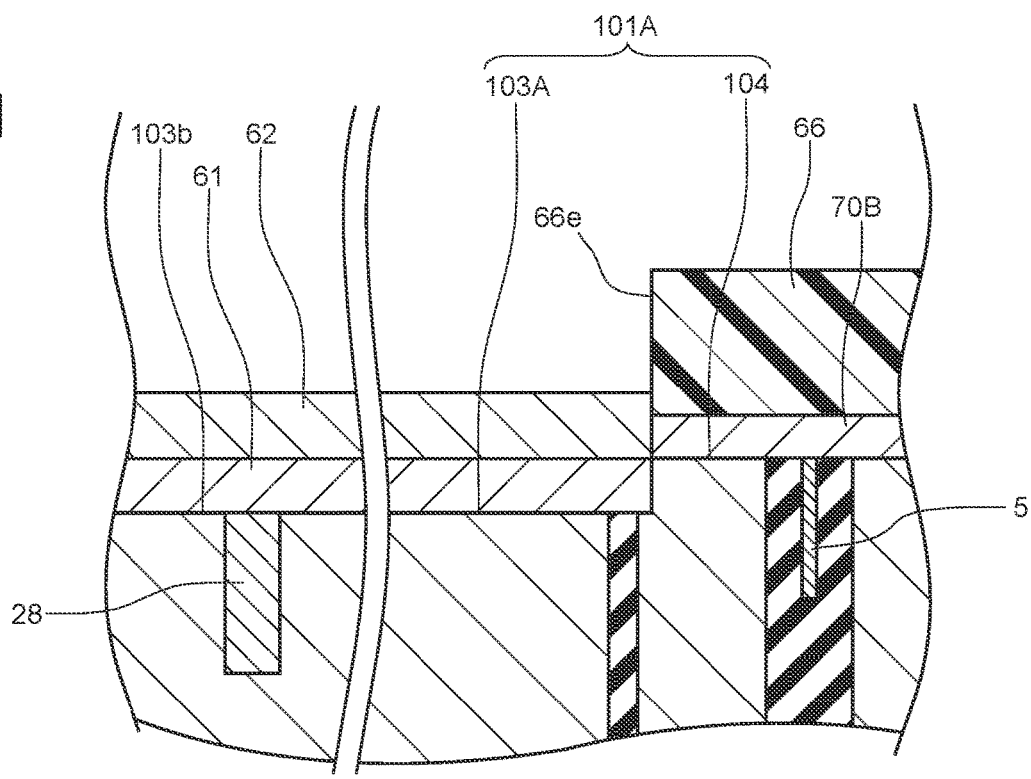
FIG. 21 is a sectional view showing a step subsequent to that in FIG. 20.

Next, as illustrated in FIG. 21, the seed layer 61, the YSZ protective layer 62 are formed sequentially in a part (recess concave part 103*b*) which the resist pattern 66 does not cover.

Figure 22:
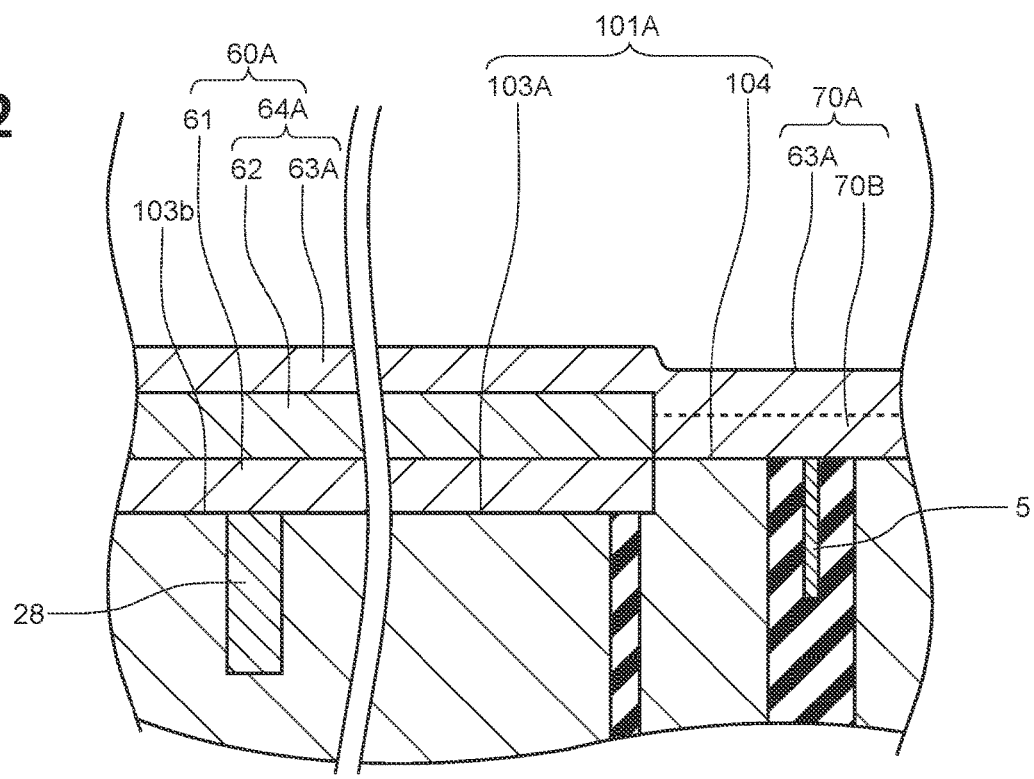
FIG. 22 is a sectional view showing a step subsequent to that in FIG. 21.

Further, as illustrated in FIG. 22, the resist pattern 66 is removed, after that, the hard protective layer 63A is formed with DLC in the ABS 101A. Then, because the reading head protective film 70B is already formed in the reading area 104, the hard protective layer 63A is integrated with the reading head protective film 70B to become the reading head protective film 70A. By the above-described steps, the stabilized protective film 60A and the reading head protective film 70A are manufactured in the magnetic head part 100A.

In the thermally assisted magnetic head 181, the ABS 101A includes the recording area 103A and the reading area 104, the stabilized protective film 60A, the reading head protective film 70A are respectively formed in the recording area 103A, the reading area 104.

The recording area 103A is similar with the recording area 103 except for the recess concave part 103*b*. The stabilized protective film 60A is similar with the stabilized protective film 60 except for the place which the seed layer 61 is formed, the reading head protective film 70A is similar with the reading head protective film 70 except for the connection with the hard protective layer 63A. Therefore, the stabilized protective film 60A has the protective level which the recording head 91 and the NFT 28 are surely protected. The reading head protective film 70A has the protective level with an extent which the magnetic data reading sensitivity dose not lower. Accordingly, the above-described both A) and B) are achieved.

The thermally assisted magnetic head 181 exhibits the same operation and effect with the thermally assisted magnetic head 180 on the other points.

Further, in the thermally assisted magnetic head 181, the recess concave part 103*b* is formed to form the seed layer 61 in the recess concave part 103*b*. Therefore, step, between the stabilized protective film 60A and the reading head protective film 70A, is reduced as compared with the thermally assisted magnetic head 180, the surface of the stabilized protective film 60A and the reading head protective film 70A becomes close to flat surface.

In general, in the hard disk drive, for surely maintaining a surfacing amount of the thermally assisted magnetic head from the hard disk in a predetermined size, testing, for temporary contact of the thermally assisted magnetic head to the surface of the hard disk, is performed (this contact is also called "touch down"). The touch down is performed for a position, of the hard disk, which is aimed (this position is also called "target position").

However, when the step, between the stabilized protective film 60 and the reading head protective film 70, exists, like the thermally assisted magnetic head 180, the touch down is likely to occur in a position different from the target position (such touch down is also caller "early touch down"). On this point, as the thermally assisted magnetic head 181, the step, between the stabilized protective film 60A and the reading head protective film 70A, is reduced, thereby possibility of occurring the "early touch down" is able to be reduced.

(Embodiments of Head Gimbal Assembly and Hard Disk Drive)

Next, embodiments of the head gimbal assembly and hard disk drive will now be explained with reference to FIG. 23 to FIG. 24.

Figure 23:
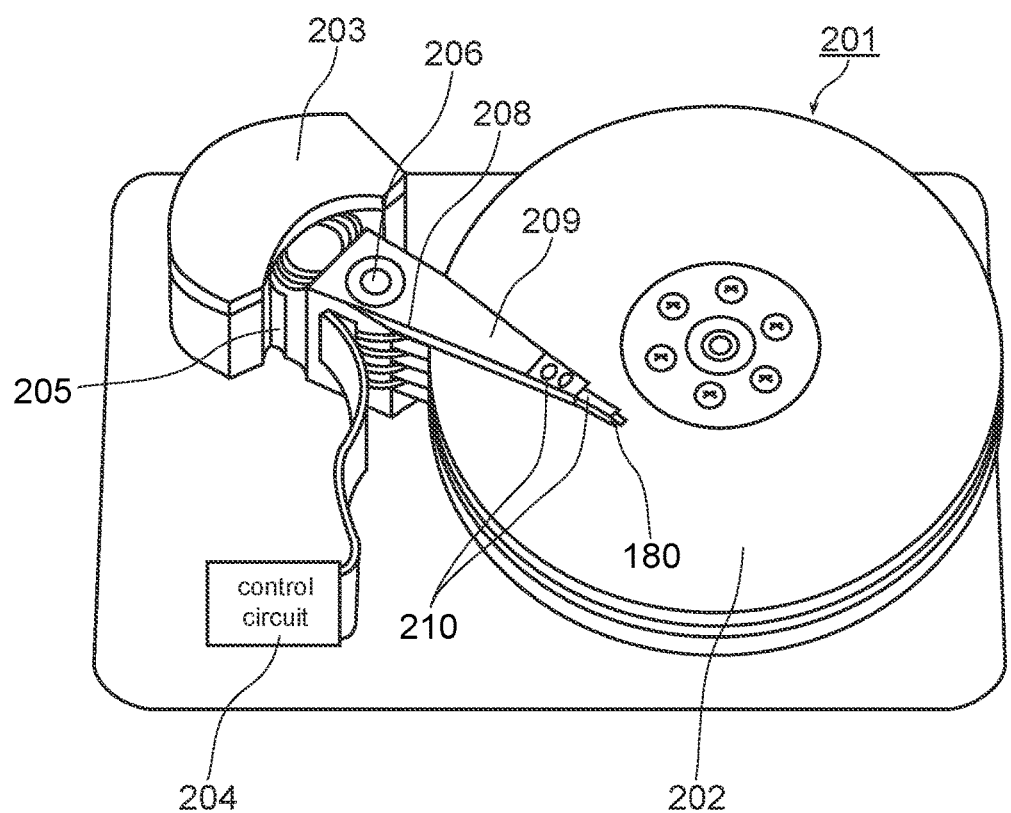
FIG. 23 is a perspective view illustrating a hard disk drive equipped with the thermally assisted magnetic head in FIG. 1.

FIG. 23 is a perspective view showing a hard disk drive 201 equipped with the above-mentioned thermally assisted magnetic head 180. The hard disk drive 201 includes a hard disk (magnetic recording medium) 202 rotating at a high speed and a head gimbal assembly (HGA) 210. The hard disk drive 201 is an apparatus which actuates the HGA 210, so as to record/reproduce data onto/from recording surfaces of the hard disk 202. The hard disk 202 has a plurality of (4 in the drawing) platters. Each platter has a recording surface opposing its corresponding the thermally assisted magnetic head 180.

The hard disk drive 201 positions the slider 120 on a track by an assembly carriage device 203. Further, the hard disk drive 201 has a plurality of drive arms 209. The drive arms pivot about a pivot bearing shaft 206 by means of a voice coil motor (VCM) 205, and are stacked in a direction along the pivot bearing shaft 206. Further, the HGA 210 is attached to the tip of each drive arm.

Further, the hard disk drive 201 has a control circuit 204 controlling recording/reproducing and the generation of light by the laser diode 207.

Figure 24:
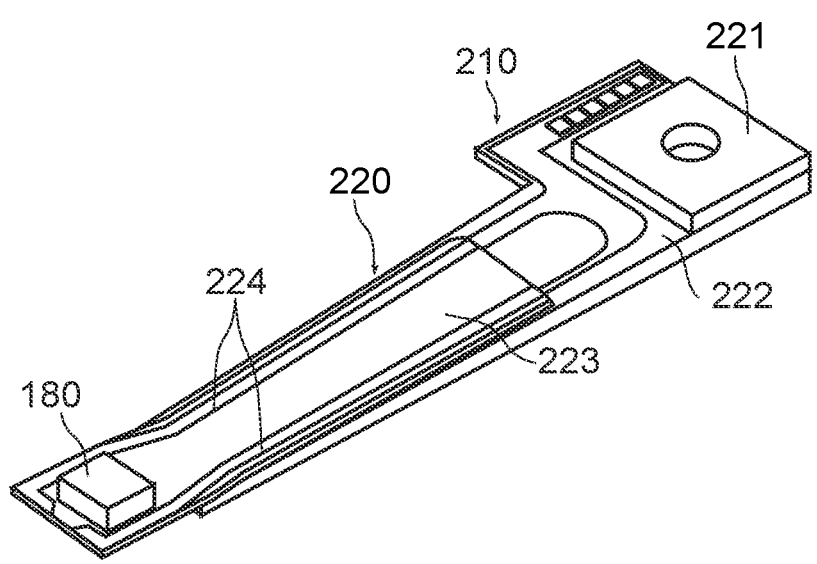
FIG. 24 is a perspective view illustrating a rear side of the HGA.
Figure 25:
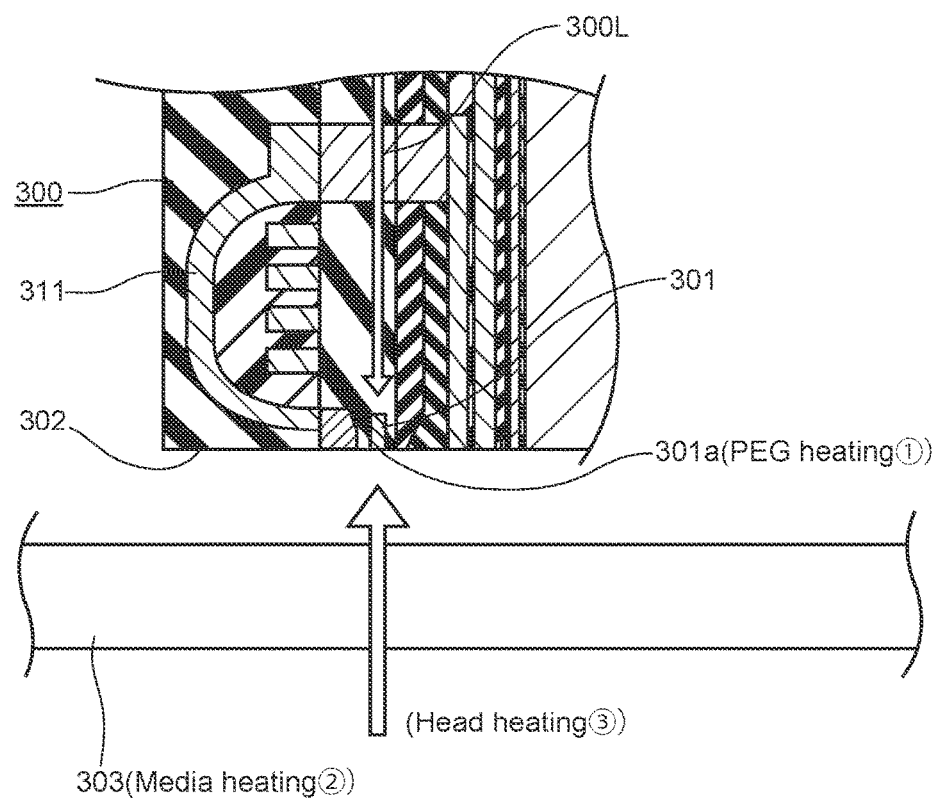
FIG. 25 is a sectional view illustrating the principal part of the conventional thermally assisted magnetic head.
Figure 26:
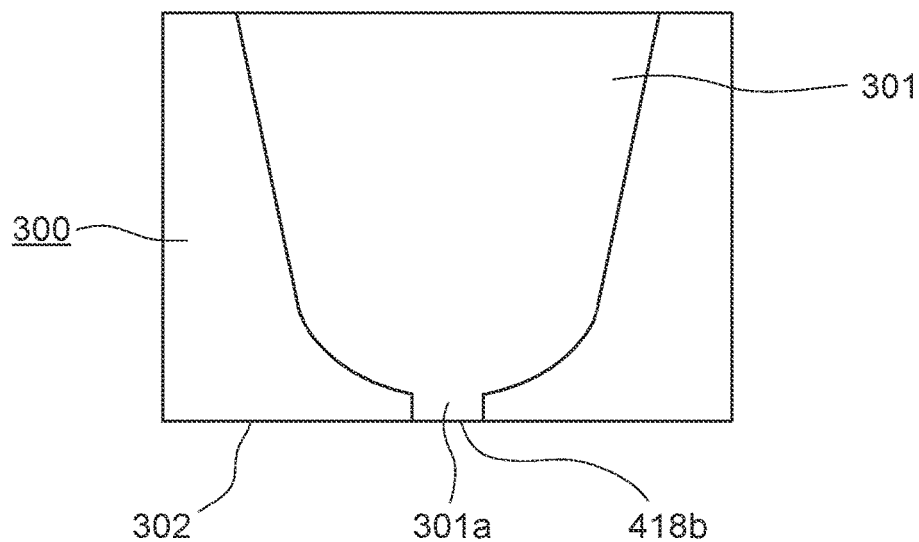
FIG. 26 is a plan view illustrating the NFT of the conventional thermally assisted magnetic head.

FIG. 24 is a perspective view illustrating a rear surface side of the HGA 210. In the HGA 210, the thermally assisted magnetic head 180 is fixed to a tip portion of a suspension 220. Further, in the HGA 210, one end portion of a wiring member 224 is electrically connected to a terminal electrode of the slider 120.

The suspension 220 has a load beam 222, a base plate 221 provided at a base portion of the load beam 222, a flexure 223 fixed to and supported on the load beam 222 from the tip end side to the front side of the base plate 221 and having elasticity, and the wiring member 224. The wiring member 224 has a lead conductor and connection pads electrically connected to both ends of the lead conductor.

In the hard disk drive 201, when the HGA 210 is rotated, the slider 120 moves in a radial direction of the hard disk 202, i.e., a direction traversing track lines.

The aforementioned HGA 210 and hard disk drive 201 have the thermally assisted magnetic head 180, thereby the above-described both A) and B) are achieved.

Though the above-mentioned embodiments explain a type in which a thin-film coil is wound like a flat spiral about the main magnetic pole layer by way of example, the present invention is also applicable to a type in which the thin-film coil is wound helically about the main magnetic pole layer.

This invention is not limited to the foregoing embodiments but various changes and modifications of its components may be made without departing from the scope of the present invention. Besides, it is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. A thermally assisted magnetic head comprising:
a slider;
wherein the slider comprises a slider substrate and a magnetic head part formed on the slider substrate,
wherein the magnetic head part comprises a recording head including an electromagnetic coil device for recording magnetic data, a reading head for reading magnetic data recorded on a magnetic recording medium, a near field transducer which generates a near field light for heating the magnetic recording medium, a medium-opposing surface opposing the magnetic recording medium,
wherein the medium-opposing surface comprises a recording area including the recording head, the near field transducer and a reading area including the reading head,
wherein the magnetic head part comprises a record/read separate protective structure which a stabilized protective film is formed on the recording area and a reading head protective film is formed on the reading area,
wherein the stabilized protective film comprises a three-layer structure which a seed layer and a double protective layer are laminated,
wherein the double protective layer comprises an yttria-stabilized zirconia (YSZ) protective layer, including a stabilized crystal structure made of adding yttrium oxide to zirconium oxide, and a hard protective layer, which is formed with a material having a hardness higher than the YSZ protective layer, being formed on the YSZ protective layer,
wherein the reading head protective film includes a thickness which is thinner than the stabilized protective film.

2. The thermally assisted magnetic head according to claim 1,
wherein the YSZ protective layer includes a Y/(Y+Zr) ratio which is set in a range of between 5 to 30,
wherein the Y/(Y+Zr) ratio means a ratio of molecular weight of yttrium in the yttrium oxide to molecular weight of yttrium in the yttrium oxide and zirconium in the zirconium oxide.

3. The thermally assisted magnetic head according to claim 1,
wherein the reading head protective film comprises a single-layer structure which is formed with one layer.

4. The thermally assisted magnetic head according to claim 1,
wherein the reading head protective film is formed with material in common with the hard protective layer.

5. The thermally assisted magnetic head according to claim 1,
wherein the magnetic head part comprises a protective film step which is formed by a recession of a surface of the reading head protective film from a surface of the stabilized protective film.

6. The thermally assisted magnetic head according to claim 1,
wherein the YSZ protective layer and the hard protective layer respectively include end surfaces exposed in a boundary part of the recording area and the reading area.

7. The thermally assisted magnetic head according to claim 1, wherein the medium-opposing surface comprises a step-ABS structure which includes a step by a recession of the recording area from the reading area.

8. The thermally assisted magnetic head according to claim 7,
wherein the magnetic head part comprises a flat structure which the surface of the seed layer is connected to the surface of the reading head protective film with no step.

9. The thermally assisted magnetic head according to claim 7,
wherein magnetic head part comprises a series structure which the hard protective layer is connected with the reading head protective film, there is no boundary between the hard protective layer and the reading head protective film.

10. The thermally assisted magnetic head according to claim 9,
a thickness of the hard protective layer is smaller than that of the reading head protective film.

11. The thermally assisted magnetic head according to claim 7,
wherein the near field transducer comprises a protruding end part, arranged in a side of the medium-opposing surface,
wherein the protruding end part is arranged in a recess surface, arranged in the recording area of the medium-opposing surface.

12. The thermally assisted magnetic head according to claim 1,
both a thickness of the YSZ protective layer and a thickness of the hard protective layer are smaller than that of the reading head protective film.

13. The thermally assisted magnetic head according to claim 1,
wherein the hard protective layer and the reading head protective film are formed with DLC.

14. A head gimbal assembly comprising a thermally assisted magnetic head,
wherein the thermally assisted magnetic head comprising:
a slider;
wherein the slider comprises a slider substrate and a magnetic head part formed on the slider substrate,
wherein the magnetic head part comprises a recording head including an electromagnetic coil device for recording magnetic data, a reading head for reading magnetic data recorded on a magnetic recording medium, a near field transducer which generates a near field light for heating the magnetic recording medium, a medium-opposing surface opposing the magnetic recording medium,
wherein the medium-opposing surface comprises a recording area including the recording head, the near field transducer and a reading area including the reading head,
wherein the magnetic head part comprises a record/read separate protective structure which a stabilized protective film is formed on the recording area and a reading head protective film is formed on the reading area,
wherein the stabilized protective film comprises a three-layer structure which a seed layer and a double protective layer are laminated,
wherein the double protective layer comprises an yttria-stabilized zirconia (YSZ) protective layer, including a stabilized crystal structure made of adding yttrium oxide to zirconium oxide, and a hard protective layer, which is formed with a material having a hardness higher than the YSZ protective layer, being formed on the YSZ protective layer,
wherein the reading head protective film includes a thickness which is thinner than the stabilized protective film.

15. A hard disk drive comprising a head gimbal assembly having a thermally assisted magnetic head, and a magnetic recording medium opposing the thermally assisted magnetic head,
wherein the thermally assisted magnetic head comprising:
a slider;
wherein the slider comprises a slider substrate and a magnetic head part formed on the slider substrate,
wherein the magnetic head part comprises a recording head including an electromagnetic coil device for recording magnetic data, a reading head for reading magnetic data recorded on a magnetic recording medium, a near field transducer which generates a near field light for heating the magnetic recording medium, a medium-opposing surface opposing the magnetic recording medium,
wherein the medium-opposing surface comprises a recording area including the recording head, the near field transducer and a reading area including the reading head,
wherein the magnetic head part comprises a record/read separate protective structure which an stabilized protective film is formed on the recording area and a reading head protective film is formed on the reading area,
wherein the stabilized protective film comprises a three-layer structure which a seed layer and a double protective layer are laminated,
wherein the double protective layer comprises an yttria-stabilized zirconia (YSZ protective layer, including a stabilized crystal structure made of adding yttrium oxide to zirconium oxide, and a hard protective layer, which is formed with a material having a hardness higher than the YSZ protective layer, being formed on the YSZ protective layer,
wherein the reading head protective film includes a thickness which is thinner than the stabilized protective film.

* * * * *